(12) United States Patent
Ishii

(10) Patent No.: US 10,052,857 B2
(45) Date of Patent: Aug. 21, 2018

(54) SHEET PROCESSING APPARATUS THAT APPLIES AN ADHESIVE FOR BINDING SHEETS

(71) Applicants: KABUSHIKI KAISHA TOSHIBA, Tokyo (JP); TOSHIBA TEC KABUSHIKI KAISHA, Tokyo (JP)

(72) Inventor: Jun Ishii, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 313 days.

(21) Appl. No.: 14/802,888

(22) Filed: Jul. 17, 2015

(65) Prior Publication Data
US 2016/0031670 A1   Feb. 4, 2016

(30) Foreign Application Priority Data
Jul. 29, 2014   (JP) .................. 2014-154182

(51) Int. Cl.
*B32B 37/18* (2006.01)
*B32B 37/00* (2006.01)
(Continued)

(52) U.S. Cl.
CPC .......... *B32B 37/18* (2013.01); *B32B 37/0046* (2013.01); *B32B 37/0084* (2013.01);
(Continued)

(58) Field of Classification Search
CPC . B32B 37/18; B32B 37/0046; B32B 37/0084; B32B 37/02; B32B 37/1292;
(Continued)

(56) References Cited

U.S. PATENT DOCUMENTS 6,330,999 B2 * 12/2001 Coombs ................ B42C 1/12
270/58.08
6,717,286 B2 *  4/2004 Tsuchiya ................ B42C 1/12
270/52.18
(Continued)

FOREIGN PATENT DOCUMENTS

JP       2009202485       9/2009

OTHER PUBLICATIONS

U.S. Appl. No. 14/619,366, filed Feb. 11, 2015.

*Primary Examiner* — Patrick H Mackey
(74) *Attorney, Agent, or Firm* — Patterson & Sheridan, LLP

(57) ABSTRACT

A sheet processing apparatus includes a sheet tray on which one or more sheets to be processed are placed, an adhesive applying unit having an end portion that faces the sheet tray and holds an adhesive material and configured to move towards the sheet tray up to a position at which the end portion is in contact with or proximate to a sheet on the sheet tray and apart from the sheet tray, a pressing member configured to move into and out of a moving path of the adhesive applying unit and a control unit. The control unit is configured to cause the pressing member to be in the moving path of the adhesive applying unit when the pressing member is moved towards the sheet tray, such that the pressing member is pressed against a sheet on the sheet tray by the adhesive applying unit.

20 Claims, 44 Drawing Sheets

(51) Int. Cl.
*B32B 37/02* (2006.01)
*B32B 37/12* (2006.01)
*B65H 31/36* (2006.01)
*B42C 1/12* (2006.01)
*B42C 9/00* (2006.01)
*G03G 15/00* (2006.01)

(52) U.S. Cl.
CPC .......... *B32B 37/02* (2013.01); *B32B 37/1292* (2013.01); *B42C 1/125* (2013.01); *B42C 9/00* (2013.01); *B65H 31/36* (2013.01); *G03G 15/6538* (2013.01); *B65H 2301/4212* (2013.01); *B65H 2301/4213* (2013.01); *B65H 2301/5113* (2013.01); *B65H 2301/5161* (2013.01); *B65H 2404/1114* (2013.01); *B65H 2801/27* (2013.01)

(58) Field of Classification Search
CPC ........... B42C 1/125; B42C 9/00; B65H 31/36; G03G 15/6538
See application file for complete search history.

(56) References Cited

U.S. PATENT DOCUMENTS

| | | | |
|---|---|---|---|
| 6,997,452 B2* | 2/2006 | Silverbrook | B41J 13/106 270/58.12 |
| 2015/0063953 A1* | 3/2015 | Taguchi | B42C 19/02 412/37 |
| 2015/0174941 A1* | 6/2015 | Osada | B42C 9/0081 412/37 |
| 2015/0251869 A1* | 9/2015 | Taguchi | B65H 37/02 412/11 |
| 2016/0279998 A1* | 9/2016 | Taguchi | B42C 9/0081 |

* cited by examiner

SHEET PROCESSING APPARATUS THAT APPLIES AN ADHESIVE FOR BINDING SHEETS

CROSS-REFERENCE TO RELATED APPLICATION

This application is based upon and claims the benefit of priority from Japanese Patent Application No. 2014-154182, filed Jul. 29, 2014, the entire contents of which are incorporated herein by reference.

FIELD

Embodiments described herein relate generally to sheet processing apparatus, in particular a sheet processing apparatus that applies an adhesive for binding sheets.

BACKGROUND

A sheet processing apparatus processes one or more sheets after images are formed on the sheets. A sheet processing apparatus of one type staples a plurality of sheets.

However, the stapled sheets may damage a shredder when the stapled sheets are introduced without removing the staple binding the sheets. In addition, even if the staples are removed from the stapled sheets, the stapled sheets may cause a sheet jam when the stapled sheets are reused.

DETAILED DESCRIPTION

Embodiments described herein are directed to solve the above-described problem, and provide a technique for binding multiple sheets using an adhesive.

In general, according to one embodiment, a sheet processing apparatus includes a sheet tray on which one or more sheets to be processed are placed, an adhesive applying unit having an end portion that faces the sheet tray and holds an adhesive material and configured to move towards the sheet tray up to a position at which the end portion is in contact with or proximate to a sheet on the sheet tray and apart from the sheet tray, a pressing member configured to move into and out of a moving path of the adhesive applying unit and a control unit. The control unit is configured to cause the pressing member to be in the moving path of the adhesive applying unit when the pressing member is moved towards the sheet tray, such that the pressing member is pressed against a sheet on the sheet tray by the adhesive applying unit.

Hereinafter, embodiments will be described with reference to the drawings.

First Embodiment

First, a sheet binding device and a post-processing apparatus (so-called finisher) including the sheet binding device according to a first embodiment will be described.

Figure 1:
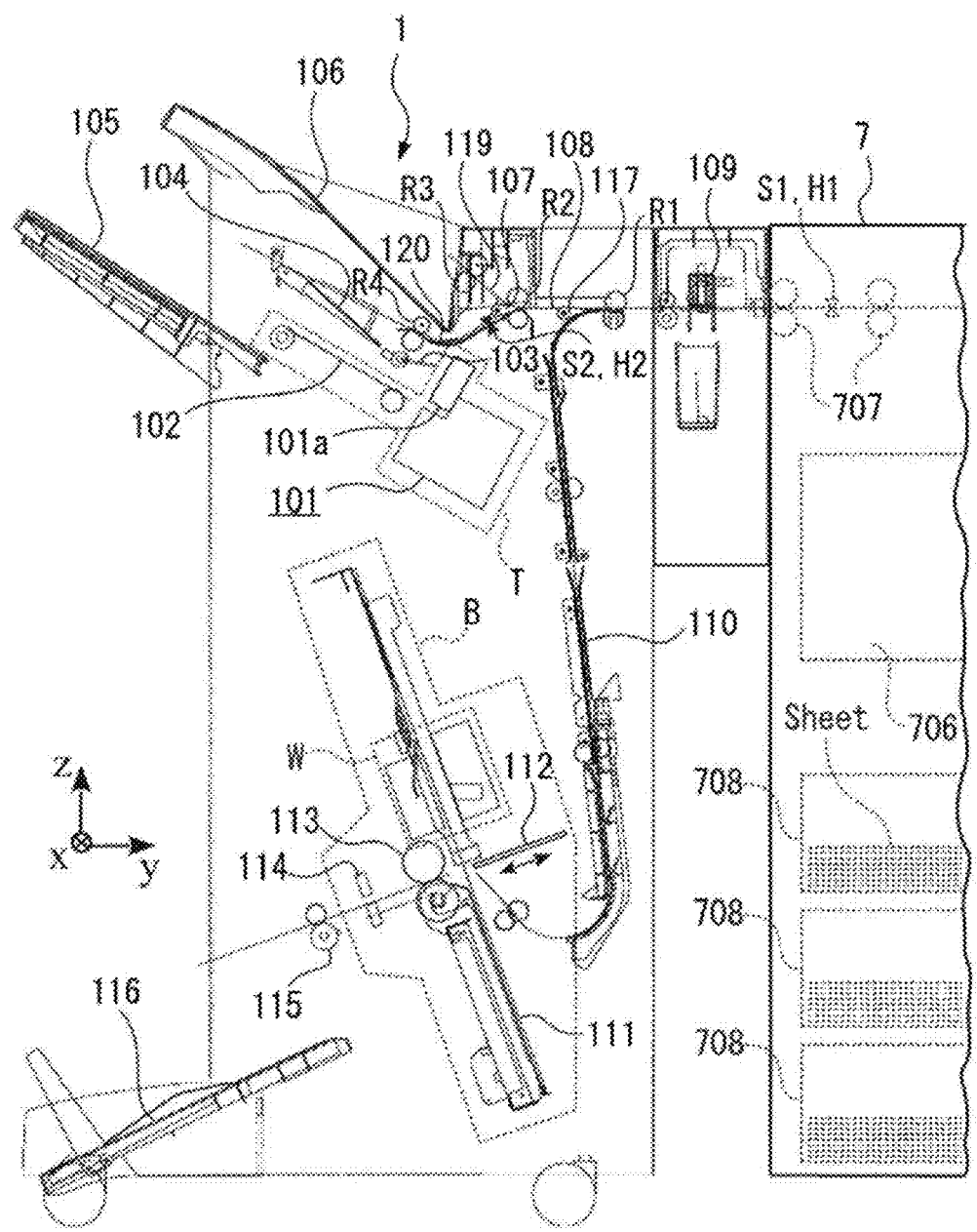
FIG. 1 is a vertical cross-sectional view of a post-processing apparatus according to a first embodiment.

Apparatus Configuration:

FIG. 1 is a schematic vertical cross-sectional view of a post-processing apparatus 1 according to the first embodiment.

For example, the post-processing apparatus 1 according to the first embodiment receives a sheet output from an image forming apparatus 7, which is connected to the post-processing apparatus 1 and communicable therewith, and performs various processes such as binding, folding, and punching on the sheet.

For example, as processing functions, the post-processing apparatus 1 includes a binding unit T, a folding unit B, a stapler W, and a punching unit 109. The post-processing apparatus 1 may include at least the binding unit T.

A sheet having an image formed thereon in the image forming apparatus 7 first passes through the punching unit 109. If the sheet is to be punched, the punching unit 109 punches the sheet at this time.

A transport destination of the sheet passing through the punching unit 109 can be switched to any one of a transport path 110 and a transport path 108 by a flapper 117.

If only the punching is to be performed on the sheet, or if the sheet passing through the punching unit 109 is to be discharged from the apparatus without a further process, the sheet is guided to the transport path 108 by the flapper 117, then to a transport path 119 by a flapper 107, and is discharged onto a first discharge tray 106.

If the binding unit T performs binding on the sheet, the sheet guided to the transport path 108 is further guided to a transport path 120 by the flapper 107, and is discharged onto a temporary tray 104 (so-called buffer tray).

The sheet discharged on the temporary tray 104 is then hit and dropped by a rotary paddle 103 rotating counterclockwise from the above in FIG. 1, and is stacked on a processing tray 102.

Figure 2:
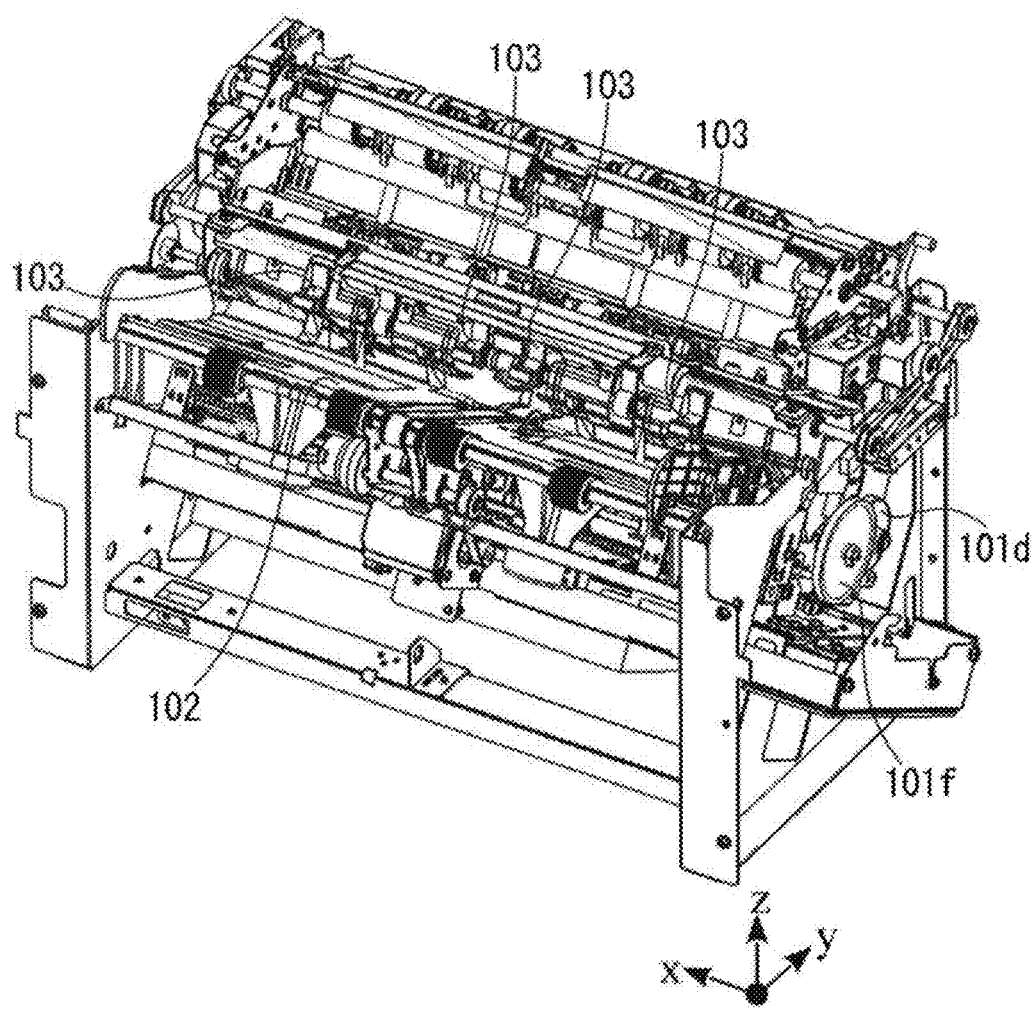
FIG. 2 is a perspective view of a binding unit in the post-processing apparatus from a side of a processing tray.
Figure 3:
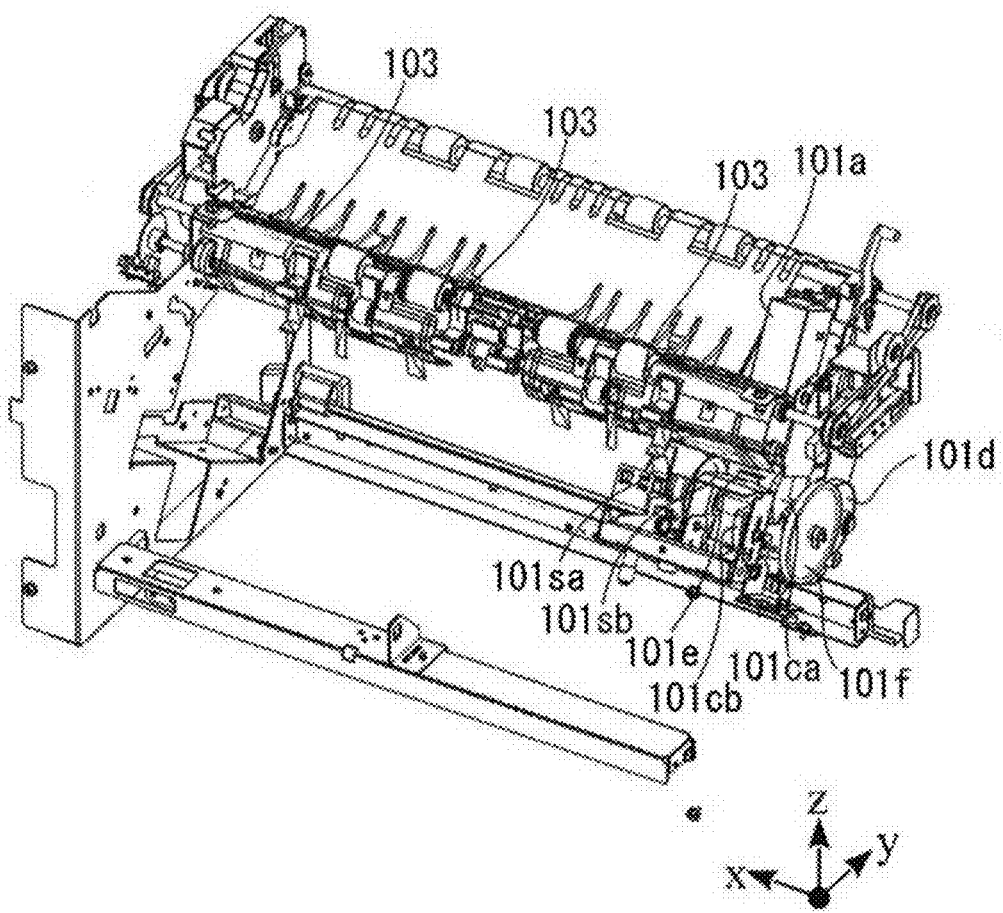
FIG. 3 is an exploded perspective view of the binding unit from the side of the processing tray.
Figure 4:
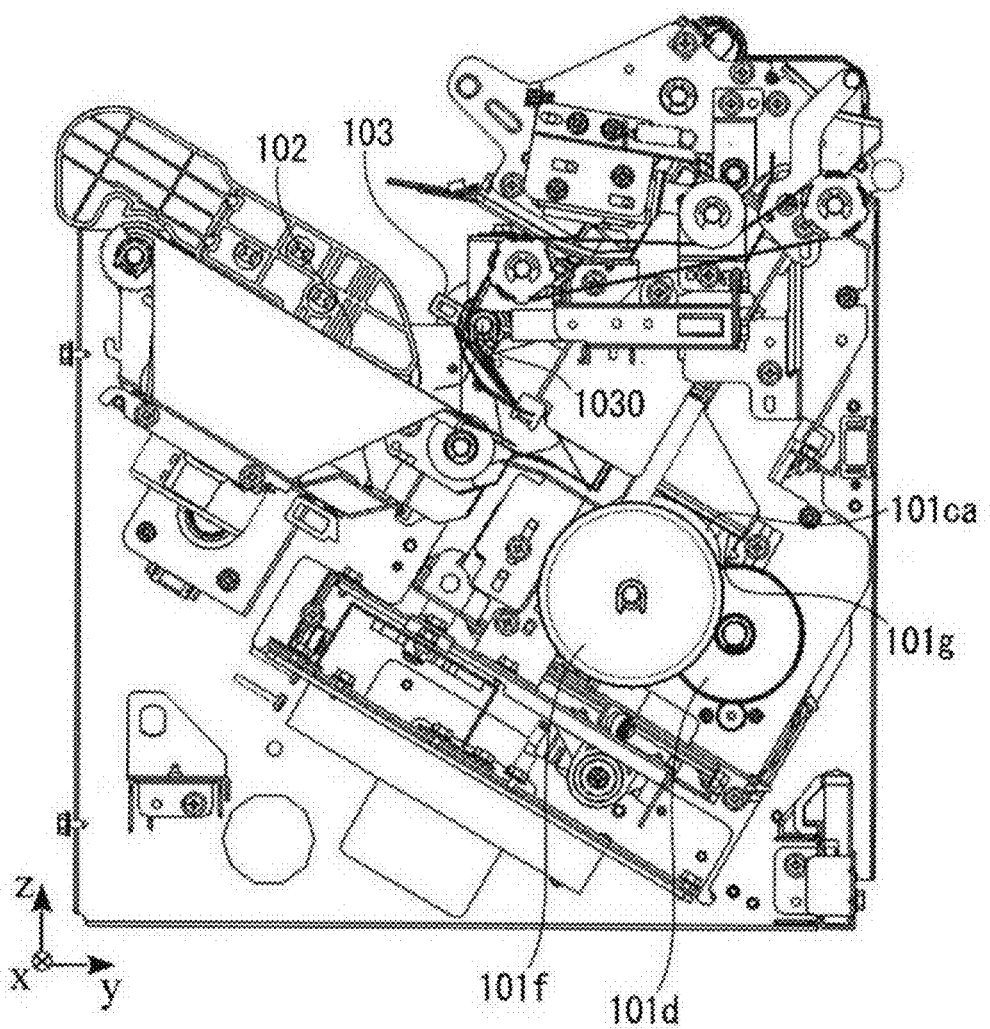
FIG. 4 is a side view of the binding unit in an extending direction of a rotary shaft of the rotary paddle.

FIG. 2 is a perspective view of a portion of the post-processing apparatus 1 around the binding unit T from the processing tray 102 side. FIG. 3 is an exploded perspective view of the portion of the post-processing apparatus 1 from the processing tray 102 side. In addition, FIG. 4 is a side view of a portion of the post-processing apparatus 1 and illustrates a positional relationship among the binding unit T, the processing tray 102, and the rotary paddle 103 when viewed in an extending direction of a rotary shaft 1030 of the rotary paddle 103.

The binding unit T includes a pasting unit 101 which puts a paste on an upper surface of the sheet stacked on the processing tray 102. The binding unit T causes the pasting unit 101 to discharge the paste on the upper surface of the sheet each time the sheet is stacked on the processing tray 102. However, for example, if a sheet bundle of 10 sheets is bound, the paste is not put on the upper surface of the tenth sheet (uppermost sheet stacked).

If all sheets except for the uppermost sheet within multiple binding target sheets stacked on the processing tray 102 are pasted, the multiple sheets configuring a binding target sheet bundle, which are in an overlapped and stacked state, are pressed toward the processing tray 102 by the binding unit T. Here, the pasting unit 101 causes an adhesive (paste) to adhere onto the sheet. A pressing mechanism presses the multiple sheets, and causes the adhesive to firmly adhere to (crimp) a portion between the two adjacent sheets, thereby completing the sheet binding.

If folding or stapling is performed on the sheet passing through the punching unit 109, the flapper 117 guides the sheet to the transport path 110, and the stapler W performs stapling or the folding unit B performs folding of the sheet discharged onto a stacker 111. Specifically, the folding unit B causes a folding blade 112 and a folding roller 113 to fold the sheet bundle on which the stapler W performs the stapling, and causes additional folding rollers 114 to further press a folding portion therebetween. Thereafter, discharge rollers 115 discharge the folded sheet bundle onto a third discharge tray 116.

The bundle of the multiple bound sheets is discharged onto a second discharge tray 105 by a discharge member (not illustrated) disposed in the processing tray 102.

Figure 5:
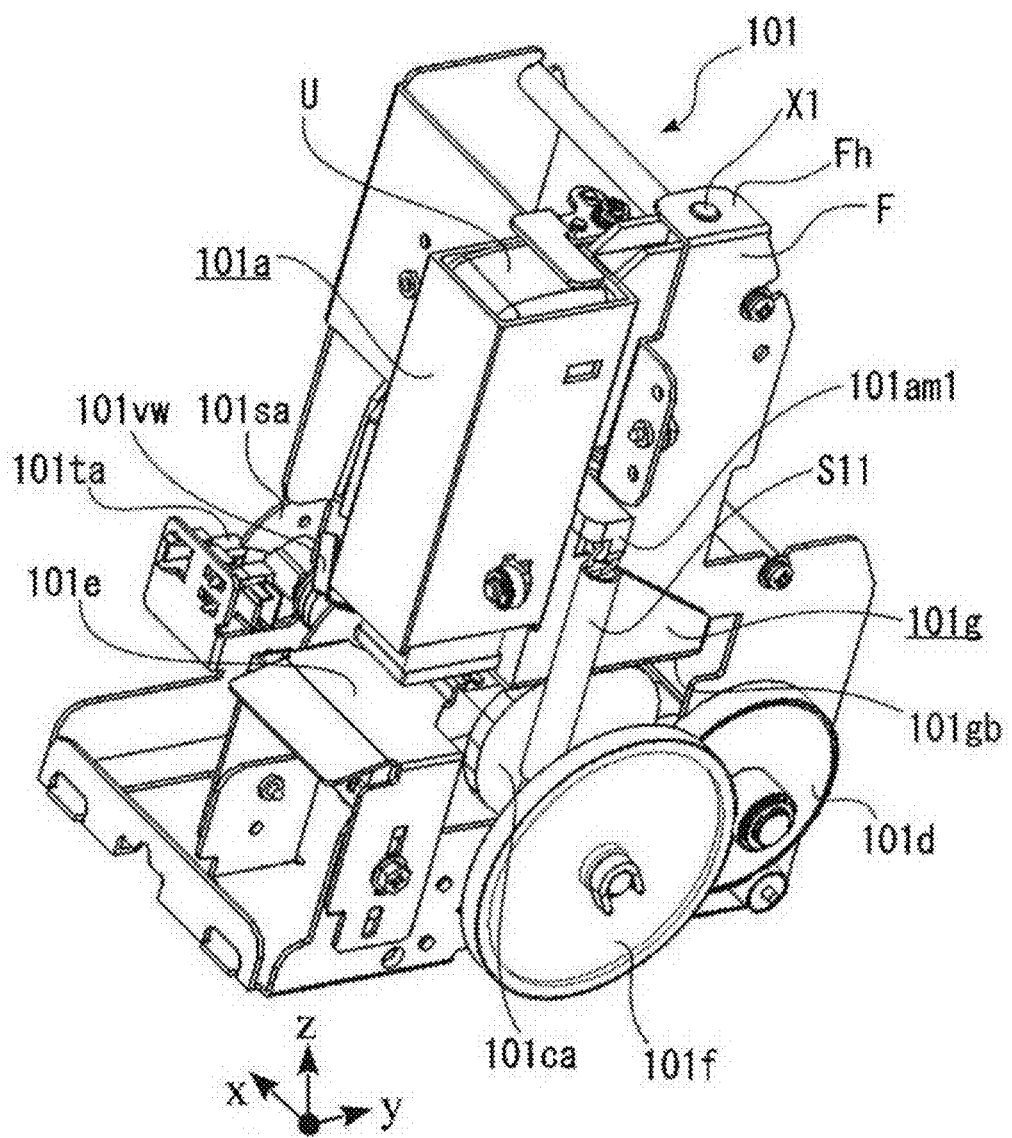
FIG. 5 is a perspective view of the binding unit around a pasting unit (sheet binding device).
Figure 6:
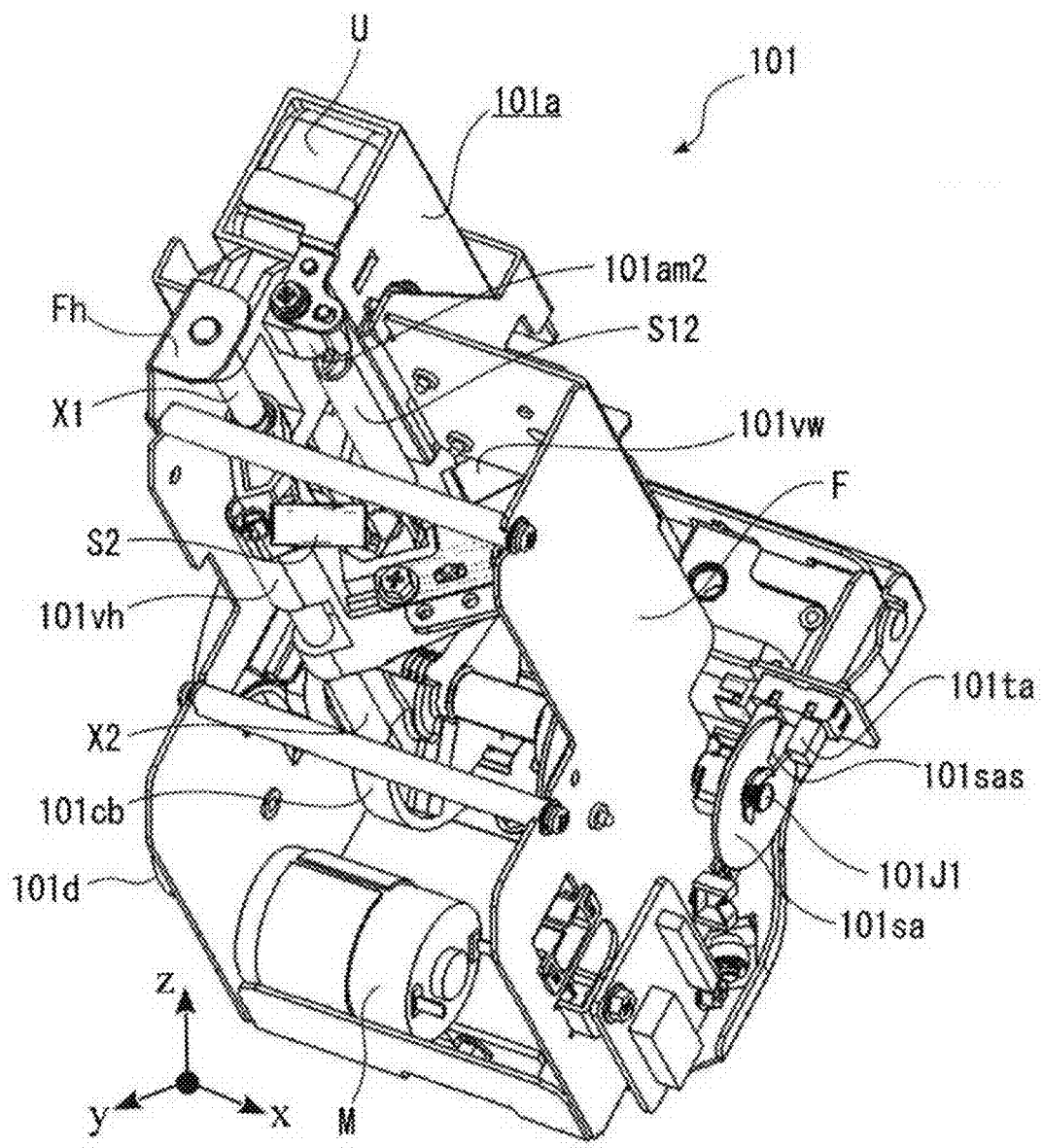
FIG. 6 is a perspective view of the binding unit around the pasting unit from another angle.
Figure 7:
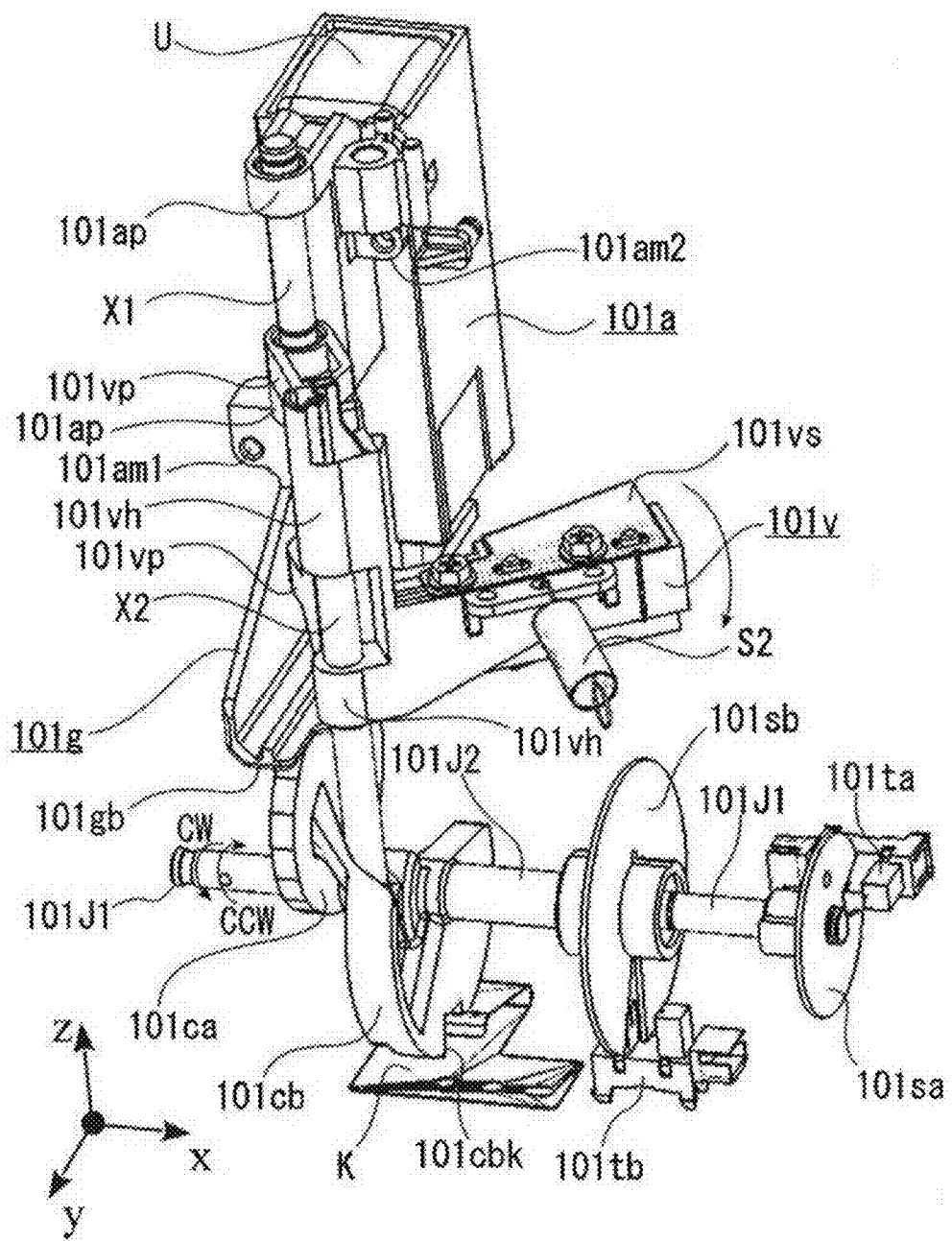
FIG. 7 is a perspective view of a first support mechanism and a second support mechanism in the binding unit.
Figure 8:
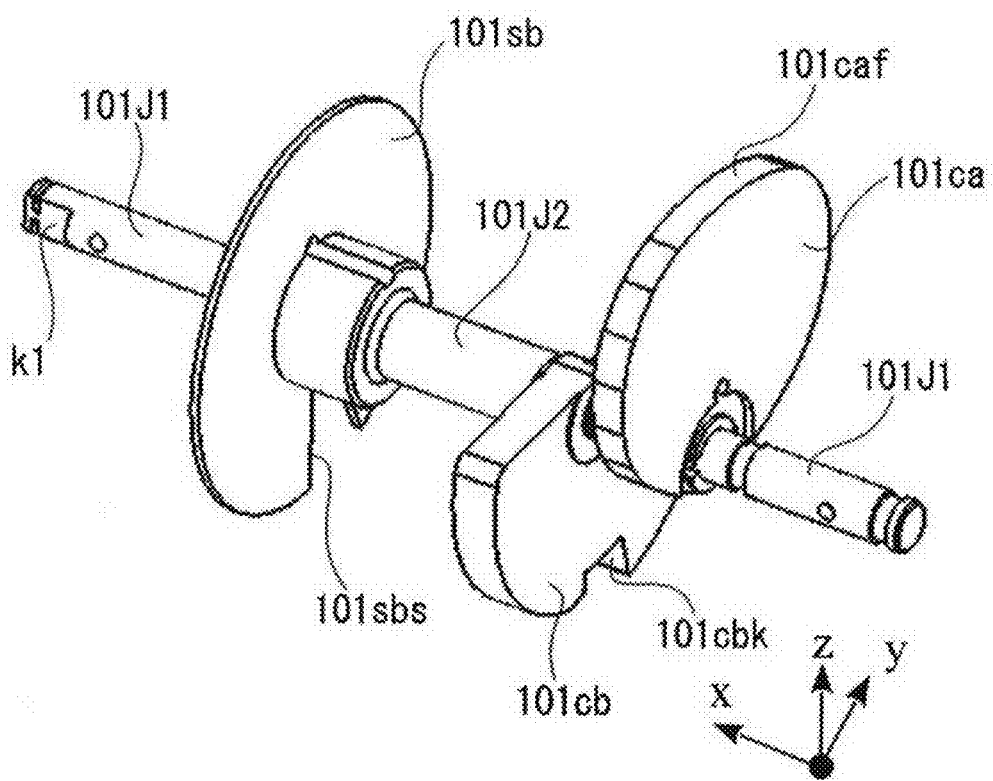
FIG. 8 is a perspective view of a rotary shaft and a cam which are included in the first support mechanism and the second support mechanism.
Figure 9:
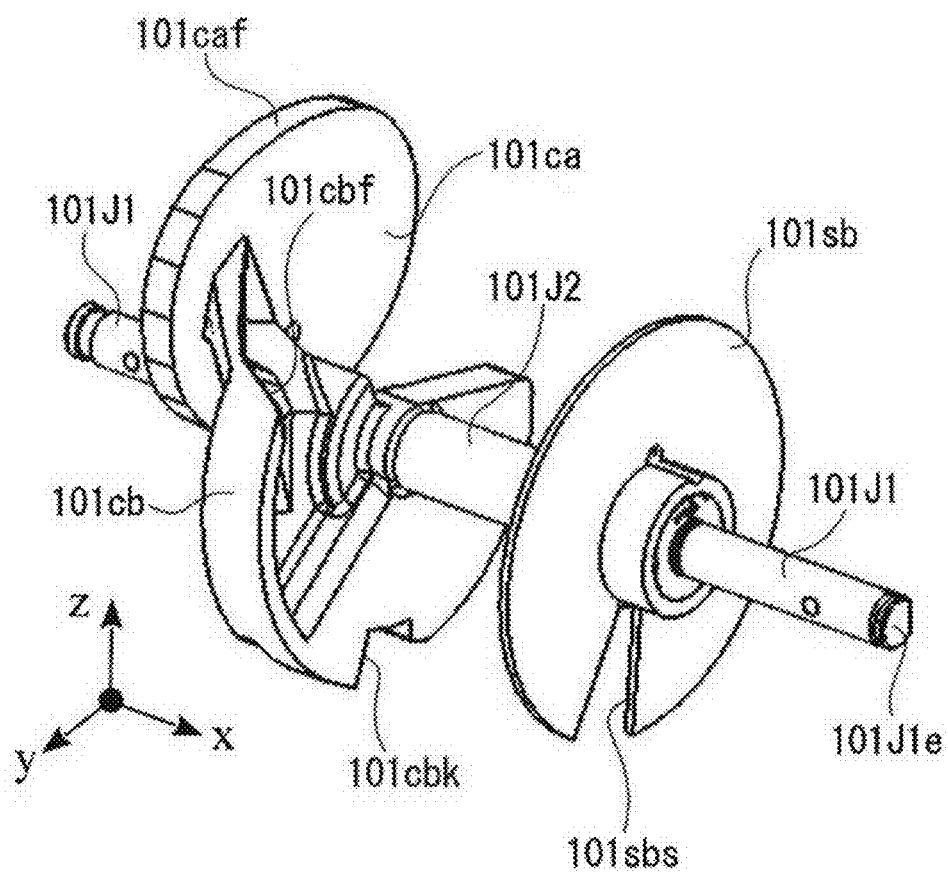
FIG. 9 is a perspective view of the rotary shaft and the cam which are included in the first support mechanism and the second support mechanism from another angle.

FIG. 5 is a perspective view of the pasting unit 101 and illustrates a configuration of the pasting unit 101 (sheet binding device) in the binding unit T. FIG. 6 is a perspective view of the pasting unit 101 viewed from another angle. FIG. 7 is a perspective view of a first support mechanism and a second support mechanism in the pasting unit. FIGS. 8 and 9 are perspective views of a rotary shaft and a cam, which are included in the first support mechanism and the second support mechanism.

As illustrated in FIG. 5, for example, the pasting unit 101 includes an adhesive application unit U, the first support mechanism, a shutter member 101vw, and the second support mechanism.

The adhesive application unit U is a pasting unit which causes a paste (adhesive) for bonding the sheets to adhere to the sheets. Specifically, for example, the pasting unit 101 may apply the paste by causing a mesh containing liquefied paste to contact the sheets. The adhesive application unit U applies the adhesive to a predetermined region on the upper surface of the sheets abutting to an abutting alignment position of the processing tray 102.

The first support mechanism includes a frame F, a guiding shaft X1, a holding unit 101a, tensile springs S11 and S12, a first rotary shaft 101J1, a first cam 101ca, a receiving unit 101g, and a motor M.

Specifically, in the first support mechanism, both ends of the guiding shaft X1 are supported by the frame F. The adhesive application unit U is disposed inside the holding unit 101a, which has a container shape and is slidably supported by the guiding shaft X1 so as to be freely lifted and lowered. The guiding shaft X1 extends along a direction in which the adhesive application unit U moves close to and apart from the sheet.

A slider 101ap is disposed on an outer wall of the holding unit 101a that contains the adhesive application unit U and is inserted into the guiding shaft X1 so as to slide along the guiding shaft X1 (refer to FIG. 7).

The other end of the tensile springs S11 and S12, one end of which is fixed to the frame F, is connected to arms 101*am*1 and 101*am*2, which are disposed on the outer wall of the holding unit 101*a*. A tensile force of the tensile springs S11 and S12 urges the holding unit 101*a* downward along the guiding shaft X1.

The receiving unit 101*g*, of which bottom surface 101*gb* is flat, is disposed in the holding unit 101*a*, and the receiving unit 101*g* is also integrally lifted and lowered in response to a lifting and lowering operation of the holding unit 101*a*.

A gear 101*f* is fixed to one end of the first rotary shaft 101J1 which extends to be parallel to the rotary shaft 1030 of the rotary paddle 103. A rotary drive force from the motor M is transmitted to the gear 101*f* via a gear 101*d*. According to this configuration, a CPU 701 drives and controls the motor M, thereby rotates the first rotary shaft 101J1 in any desired rotational direction (clockwise or counterclockwise).

The first cam 101*ca* is fixed to the first rotary shaft 101J1. The bottom surface 101*gb* of the receiving unit 101*g* is moved in a direction of the guiding shaft X1 by contacting a cam surface 101*caf* of the first cam 101*ca* rotating integrally with the first rotary shaft 101J1.

In this way, the first support mechanism causes the motor M to rotate the first rotary shaft 101J1, thereby supporting the adhesive application unit U so as to be slidable along the guiding shaft X1 between an "adhesive application position" for pressing the sheet stacked on the processing tray 102 and applying the adhesive to the sheet surface and a "first retreat position" at which the adhesive application unit U does not interfere with a sheet stacking operation on the processing tray 102. That is, the first support mechanism has a role of supporting the adhesive application unit U so as to be slidable between the "adhesive application position" and the "first retreat position."

Figure 24:
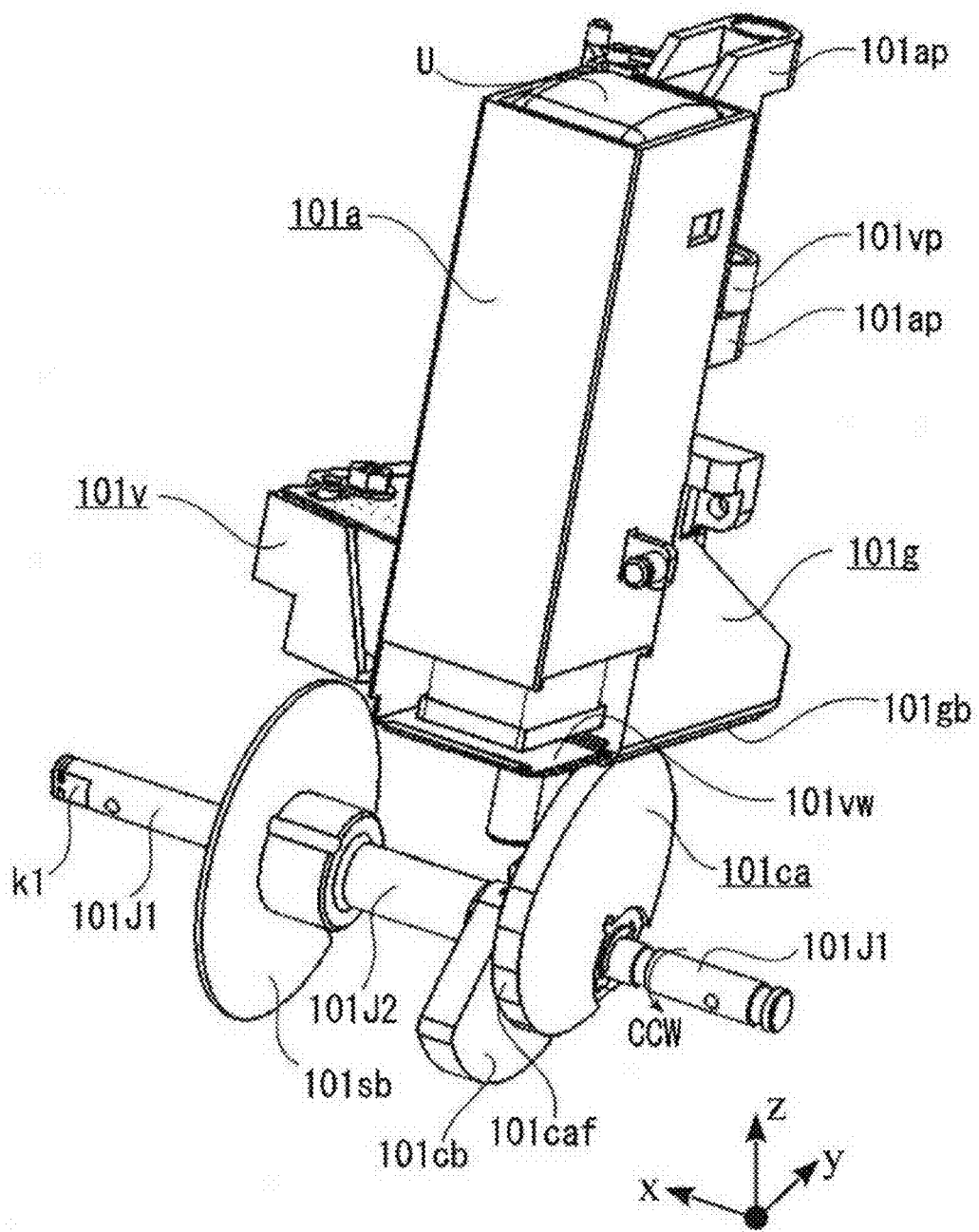
FIG. 24 is a perspective view of the binding unit when the shutter member is located at the "shielding position" from another angle.

The shutter member 101*vw* is disposed between the adhesive application unit U and the sheet stacked on the processing tray 102, and movable in a position interfering with the adhesive application to the sheet by the adhesive application unit U (for example, refer to FIG. 24).

The second support mechanism will be described with reference to FIGS. 6 and 7. The second support mechanism includes the frame F, the guiding shaft X1, a holding arm 101*v*, a tensile spring S2, the first rotary shaft 101J1, a second rotary shaft 101J2, a second cam 101*cb*, a guided shaft X2, and the motor M.

In the holding arm 101*v*, the shutter member 101*vw* is held in one end, and a slider 101*vp* having a through-hole formed therein is disposed in the other end. The guiding shaft X1, both ends of which are supported by the frame F, is inserted into the through-hole of the slider 101*vp*. The holding arm 101*v* is rotatable around the guiding shaft X1 as a support shaft. The other end of the tensile spring S2, one end of which is fixed to a main body of the post-processing apparatus 1, is connected to the vicinity of the other end of the holding arm 101*v*. In this manner, the shutter member 101*vw* is urged in a direction away from the holding unit 101*a* by the tensile force of the tensile spring S2.

A holding unit 101*vh* has a through-hole formed therein for holding the guided shaft X2 and is disposed in the vicinity of the other end of the holding arm 101*v*. The guided shaft X2 is held in a state of being inserted into the through-hole of the holding unit 101*vh*. Here, the guided shaft X2 held by the holding unit 101*vh* is parallel to the guiding shaft X1.

The first rotary shaft 101J1 is inserted into a cylindrical one-way clutch (not illustrated) of the second rotary shaft 101J2 including the one-way clutch on an inner peripheral side. In this manner, the second rotary shaft 101J2 is rotated via a one-way clutch (not illustrated) by a rotational drive force being transmitted from the first rotary shaft 101J1 when the first rotary shaft 101J1 is rotated in a first rotational direction (direction of an arrow CCW (counterclockwise) illustrated in FIG. 7), and the rotational drive force is not transmitted from the first rotary shaft 101J1 when the first rotary shaft 101J1 is rotated in a second rotational direction (direction of an arrow CW (clockwise) illustrated in FIG. 7) opposite to the first rotational direction CCW.

The second cam 101*cb* is fixed to the second rotary shaft 101J2. The second cam 101*cb* is also integrally rotated in response to the rotary operation of the second rotary shaft 101J2. A second cam surface 101*cbf* is formed on the second cam 101*cb*. The second cam surface 101*cbf* guides the guided shaft X2 only when the second cam 101*cb* is rotated in the direction of the arrow CCW illustrated in FIG. 7. When the second cam 101*cb* is rotated in the direction of the arrow CCW illustrated in FIG. 7, the guided shaft X2 is moved along the second cam surface 101*cbf*, and rotates the holding arm 101*v* against the tensile force of the tensile spring S2 in a direction closer to the holding unit 101*a*. The operation of the second cam 101*cb* causes the shutter member 101*vw* to move downward (toward the shielding position) from the adhesive application unit U.

In this way, the second support mechanism supports the shutter member 101*vw* so as to be rotatable around the guiding shaft as a fulcrum between a "shielding position (position illustrated in FIG. 23)" at which the shutter member 101*vw* is supported so as to be movable toward the surface of the sheet along the guiding shaft between the adhesive application unit U and the sheet stacked on the processing tray 102 and follows a pressing operation of the adhesive application unit U moving toward the adhesive application position and a "second retreat position (position illustrated in FIG. 7)" retreating from a movement locus of the adhesive application unit U. That is, the second support mechanism has a role as a support mechanism for supporting the adhesive application unit U so as to be movable between the "shielding position" and the "second retreat position." Here, the "movement locus" means a space through which the adhesive application unit U moves along the guiding shaft X1 between the "adhesive application position" and the "first retreat position." That is, the shutter member 101*vw* located at the "second retreat position" is out of the space through which the adhesive application unit U moves, and thus does not interfere with the movement of the adhesive application unit U.

When the shutter member 101*vw* moves to the "shielding position," the holding arm 101*v* in the second support mechanism supports the shutter member 101*vw* at a high position where the shutter member 101*vw* does not contact the uppermost sheet of sheets stacked on the processing tray 102, even if the number of sheets stacked on the processing tray 102 is a maximum stackable number.

In this way, when the shutter member 101*vw* is moved to the shielding position, the shutter member 101*vw* is supported at a high position where the shutter member 101*vw* does not contact the sheet on the processing tray 102 regardless of the number of sheets stacked on the processing tray 102. Accordingly, when the shutter member 101*vw* in the shielding position is pressed down by the adhesive application unit U moving downward, the upper surface of the uppermost sheet can be stably pressed down by the shutter member 101*vw*.

The adhesive application unit U is configured to be elastically urged from the retreat position toward the adhesive application position. As the number of sheets to be bound on the processing tray 102 increases, a sheet pressing force of the adhesive application unit U increases when the adhesive application unit U is located at the adhesive application position. In general, when the sheets are bound by using the adhesive, it is desirable to press the sheets using a stronger force as the number of sheets to be bound increases. According to this configuration, it is possible to achieve more firm binding.

Figure 10:
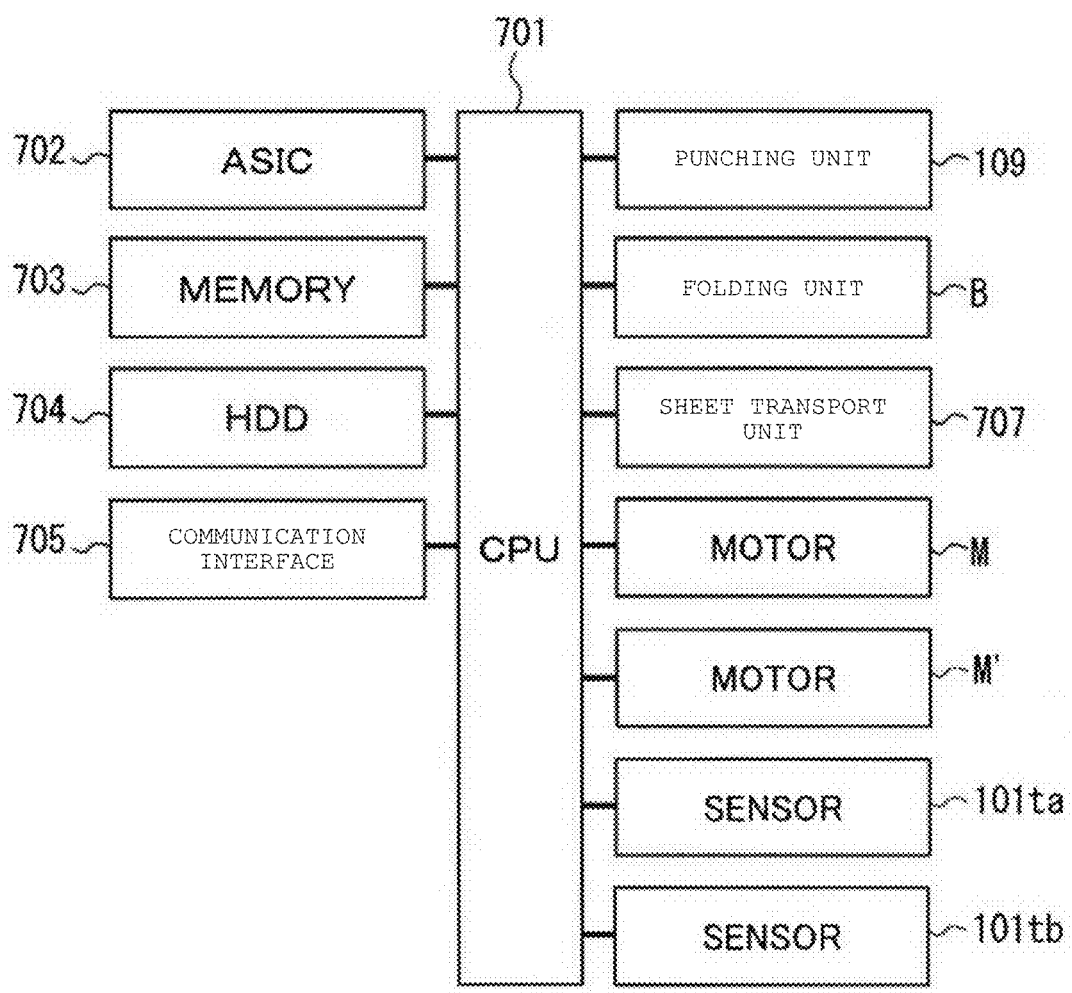
FIG. 10 is a block diagram of the post-processing apparatus including the sheet binding device according to the embodiment.

Control Block:

FIG. 10 illustrates a control block of the post-processing apparatus 1 including the sheet binding device according to the present embodiment.

As illustrated in FIG. 10, for example, the post-processing apparatus 1 includes a CPU 701, an application specific integrated circuit (ASIC) 702, a memory 703, a hard disk drive (HDD) 704, a communication interface 705, the punching unit 109, the folding unit B, a sheet transport unit 707, the motor M, a motor M', a sensor (first phase sensor) 101ta, and a sensor (second phase sensor) 101tb.

Various actuators or sensors included in the post-processing apparatus 1, such as the ASIC 702, the memory 703, the hard disk drive (HDD) 704, the communication interface 705, the punching unit 109, the folding unit B, the sheet transport unit 707, the motor M, the motor M', the sensor 101ta, and the sensor 101tb are connected to the CPU 701, and configured to communicate with the CPU 701 via a communication line such as a parallel bus and a serial bus.

The CPU 701 executes programs downloaded from the HDD 704 or an external device and loaded into the memory 703. The CPU 701 controls the punching unit 109, the folding unit B, the sheet transport unit 707, the motor M, the motor M', and the communication interface 705. Here, the motor M' is an actuator for rotating the rotary paddle 103.

In the sheet binding device and the post-processing apparatus 1 including the sheet binding device according to the present embodiment, the CPU 701 has a role of performing various processes. In addition, the CPU 701 also has a role of performing various functions by executing programs stored in the memory 703 and the HDD 704. The CPU 701 may be replaced with a micro processing unit (MPU) which may execute equivalent arithmetic processing. In addition, similarly, the HDD 704 may be replaced with a storage device such as a flash memory, for example.

For example, the memory 703 may include a random access memory (RAM), a read only memory (ROM), a dynamic random access memory (DRAM), a static random access memory (SRAM), a video RAM (VRAM), and a flash memory. The memory 703 has a role of storing various kinds of information or programs used in the sheet binding device and the post-processing apparatus 1 including the same.

Figure 11:
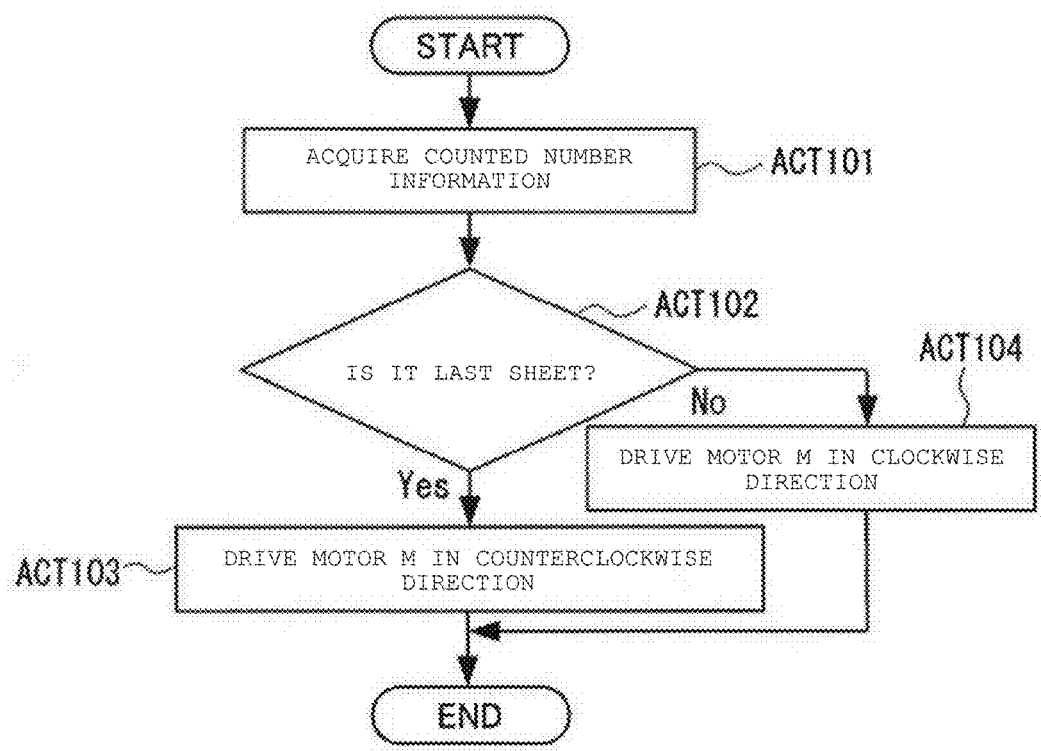
FIG. 11 is a flowchart of a process carried out by the sheet binding device according to the embodiment.

Operation Description:

FIG. 11 is a flowchart illustrating a process carried out by the sheet binding device according to the embodiment.

First, from the image forming apparatus 7, the CPU 701 (counted number information acquisition unit) acquires information (counted number information) for determining whether or not a sheet conveyed from the image forming apparatus 7 is a last sheet of sheets to be bound (ACT 101).

If the uppermost sheet stacked on the processing tray 102 is not the last sheet (ACT 102, No), the CPU 701 determines that adhesive application is needed, and drives the motor M to rotate in the clockwise direction (direction CW illustrated in FIG. 7) (ACT 104).

If the uppermost sheet stacked on the processing tray 102 is the last sheet (ACT 102, Yes), the CPU 701 does not apply the adhesive, and drives the motor M to rotate in the counterclockwise direction (direction CCW illustrated in FIG. 7) in order to press the sheet bundle stacked on the processing tray 102 (ACT 103).

First, description will be made with regard to a pasting operation (ACT 104) for sheets (the first sheet to the $(n-1)^{th}$ sheet) except for the last sheet of the sheets to be bound (the $n^{th}$ sheet if the sheet bundle has n sheets).

Figure 12:
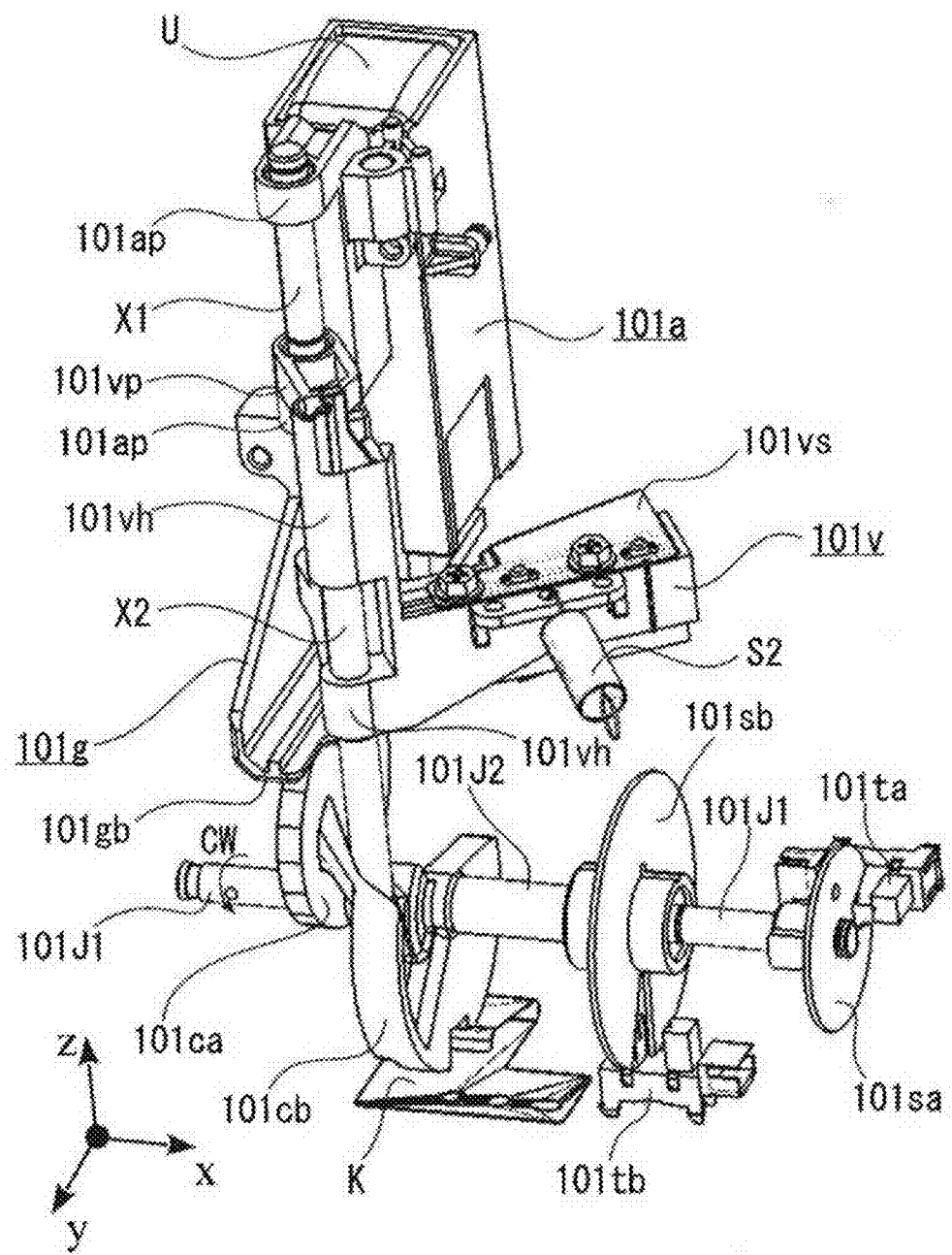
FIG. 12 is a perspective view of the binding unit when a holding unit thereof is located at a "first retreat position."
Figure 13:
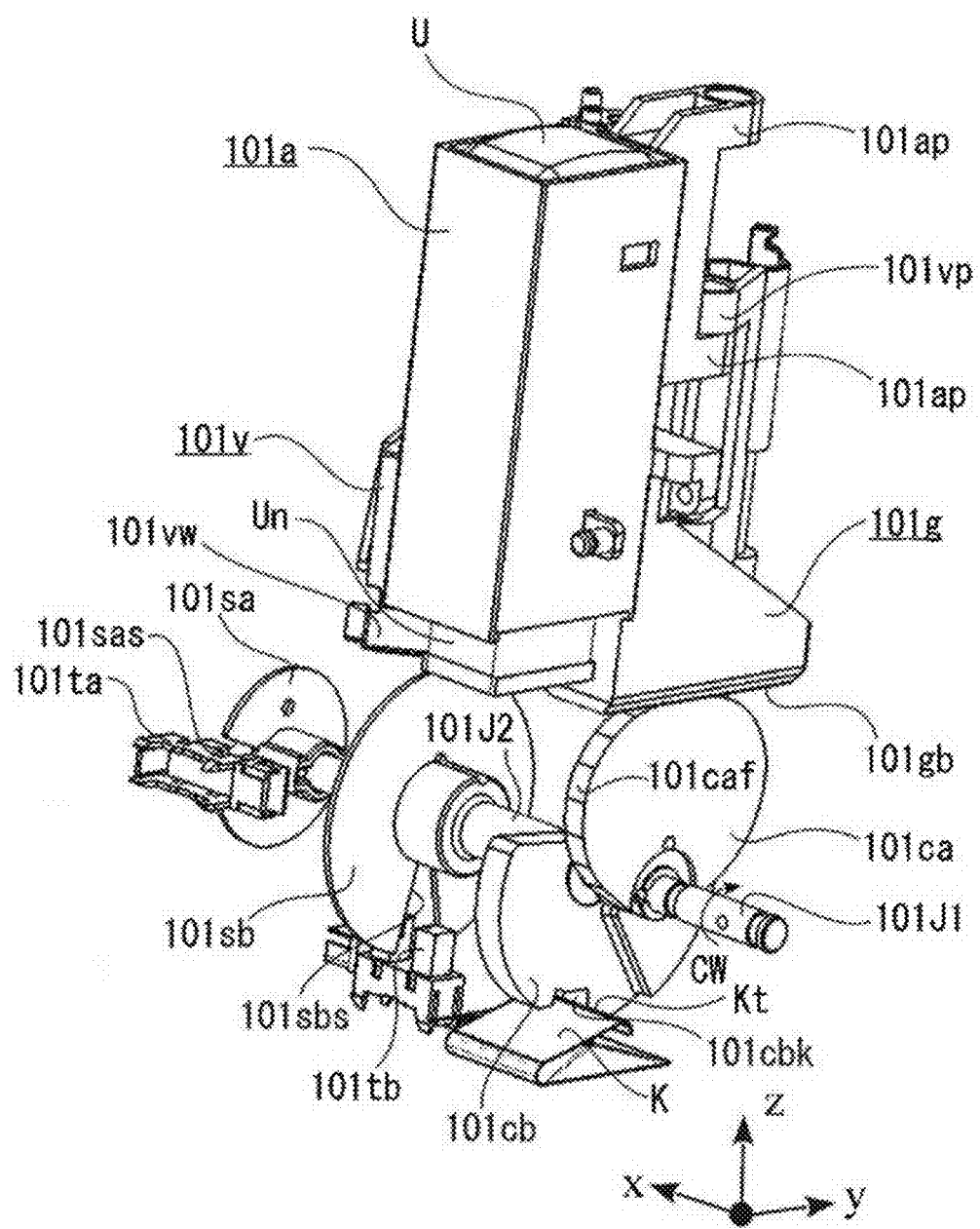
FIG. 13 is a perspective view of the binding unit when the holding unit is located at the "first retreat position" from another angle.
Figure 14:
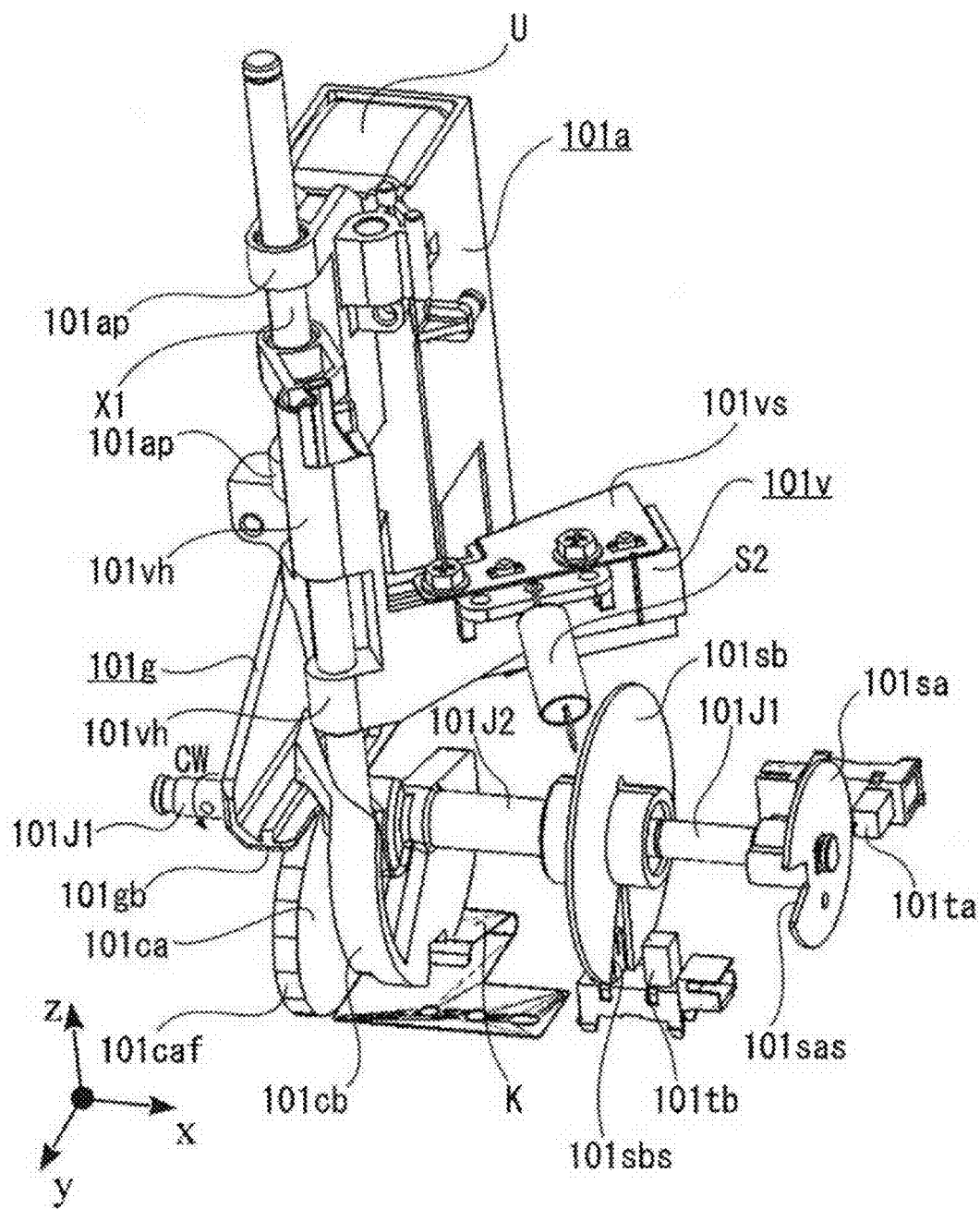
FIG. 14 is a perspective view of the binding unit when the holding unit is located at an "adhesive application position."
Figure 15:
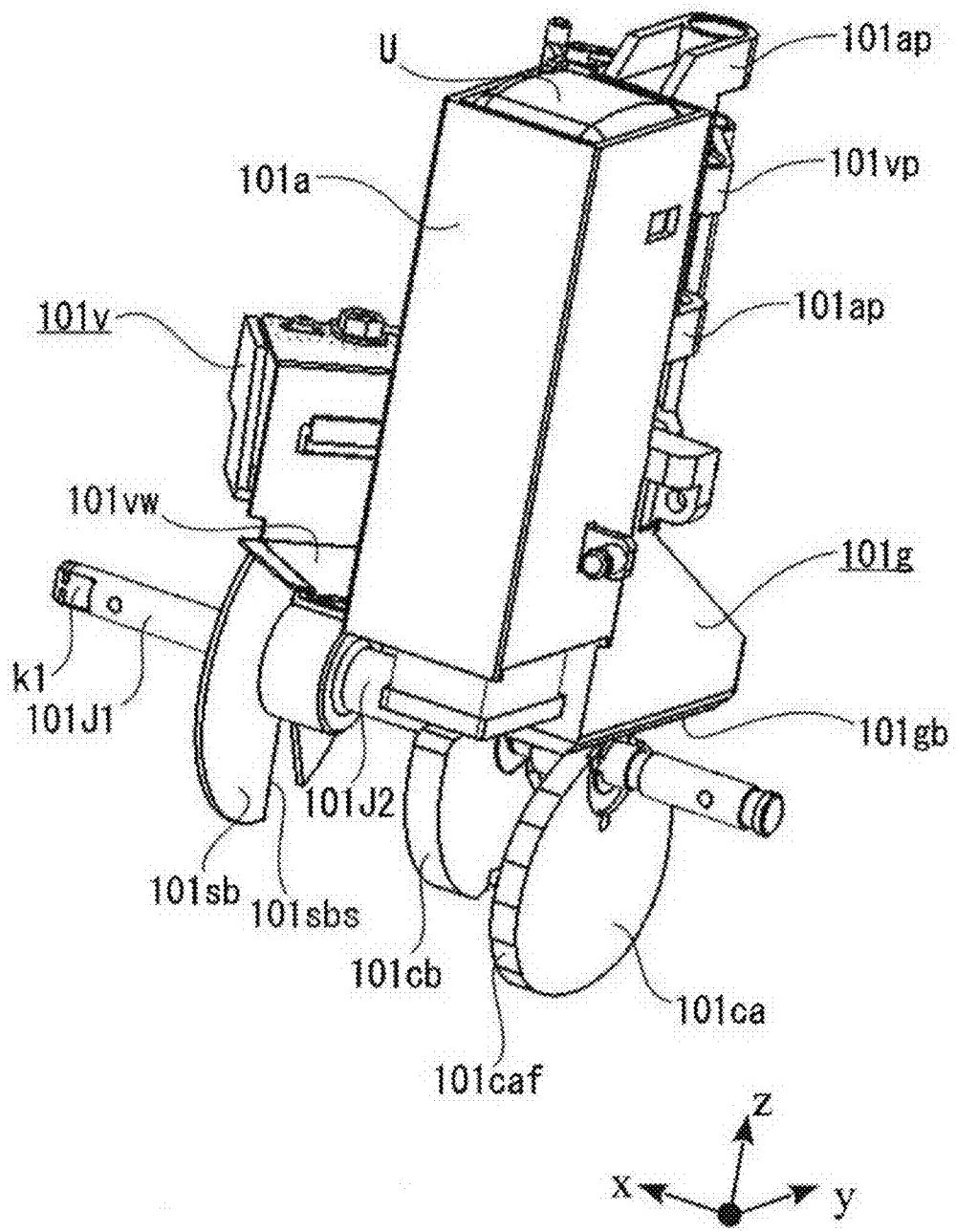
FIG. 15 is an exploded perspective view of the binding unit when the holding unit is located at the "adhesive application position." From another angle.
Figure 16:
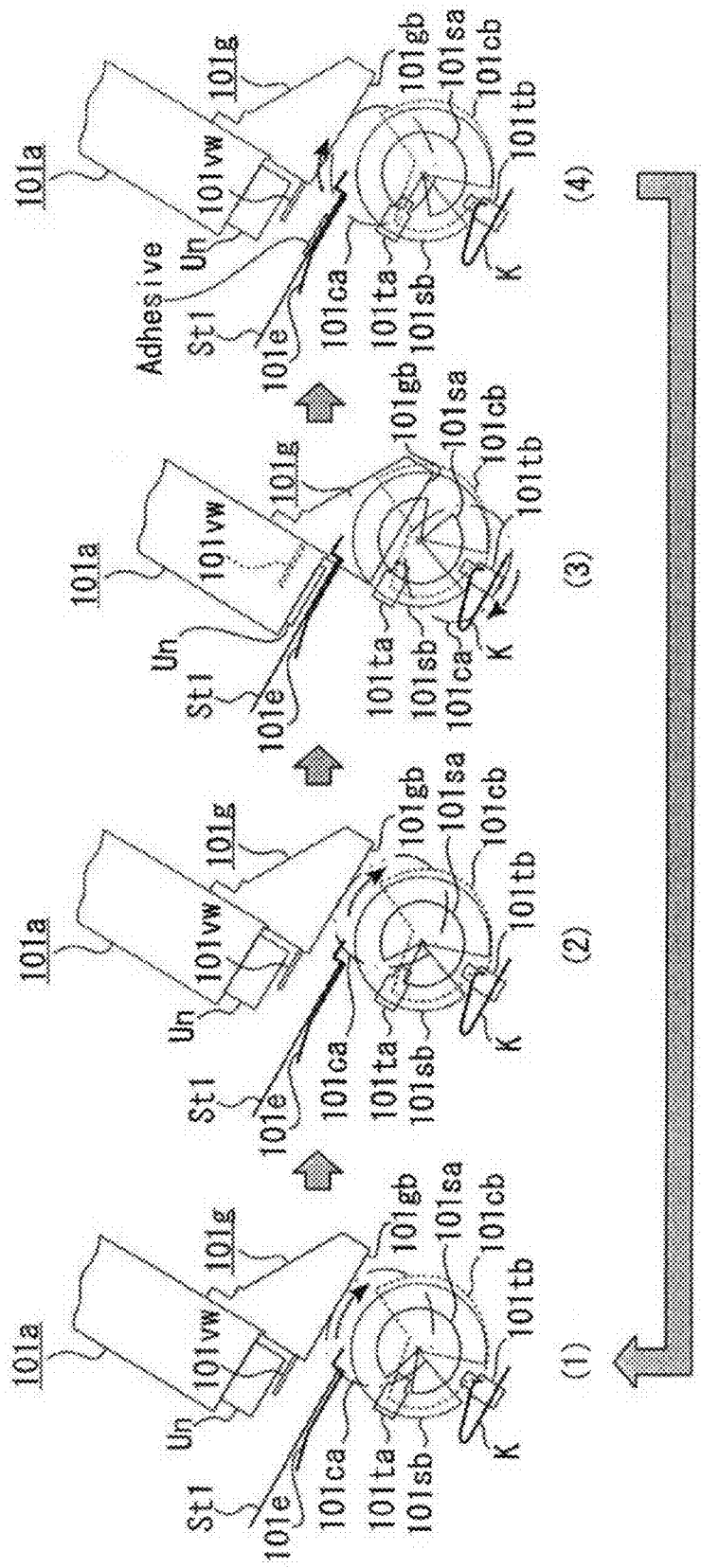
FIG. 16 illustrates a transition of each component of the binding unit when a pasting operation is performed on a first sheet of sheets to be bound.
Figure 17:
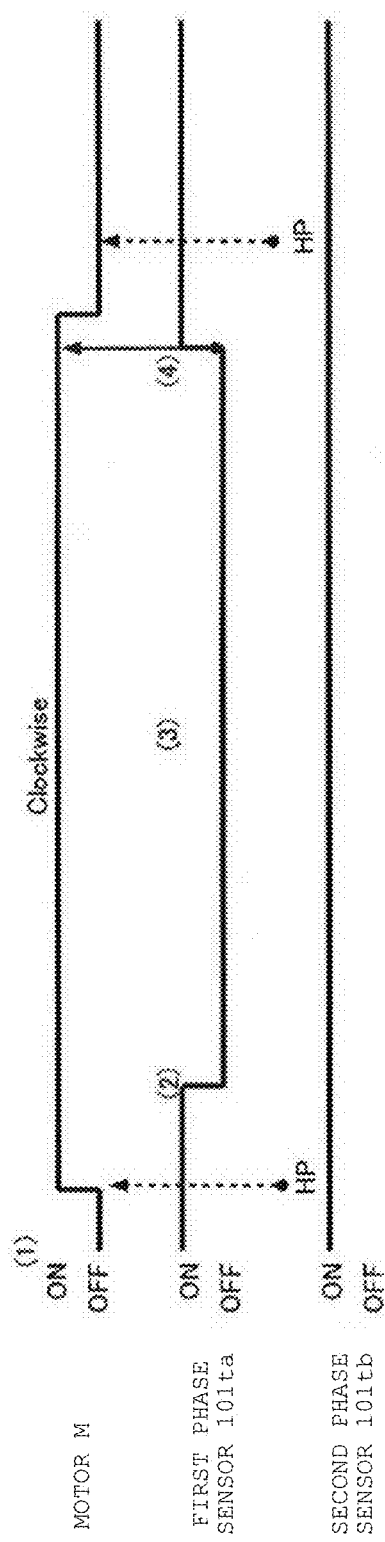
FIG. 17 is a timing chart illustrating a control operation performed by a CPU for processing the last sheet of sheets to be bound.

FIGS. 12 and 13 are perspective views of the pasting unit 101 when the holding unit 101a is located at the "first retreat position." FIGS. 14 and 15 are perspective views of the pasting unit 101 when the holding unit 101a is located at the "adhesive application position." FIG. 16 illustrates a transition of each component of the pasting unit 101 when the pasting operation is performed on a first sheet St1 of sheets to be bound. FIG. 17 is a timing chart illustrating drive control performed by the CPU 701 during processing sheets except for the last sheet.

As illustrated in FIGS. 12 to 17, the holding unit 101a in a state of being pressed upward by the first cam surface 101caf of the first cam 101ca follows the cam surface 101caf lowered in response to clockwise rotation of the first cam 101ca, and is lowered to the "adhesive application position" illustrated in FIGS. 14 and 15. At the "adhesive application position" illustrated in FIGS. 14 and 15, the adhesive application unit U applies an adhesive to an upper surface of a sheet located uppermost among sheets stacked on the processing tray 102 (refer to (4) in FIGS. 16 and 17). When the first rotary shaft 101J1 (first cam 101ca) is rotated in the clockwise direction, a cutout portion formed in the second cam 101cb is locked by a stopper K fixed to an apparatus main body in order to prevent the second rotary shaft 101J2 and the second cam 101cb from being rotated together due to frictional influence. The stopper K has a spring structure which restricts only a clockwise rotary operation of the second cam 101cb and allows counterclockwise rotation thereof.

Figure 18:
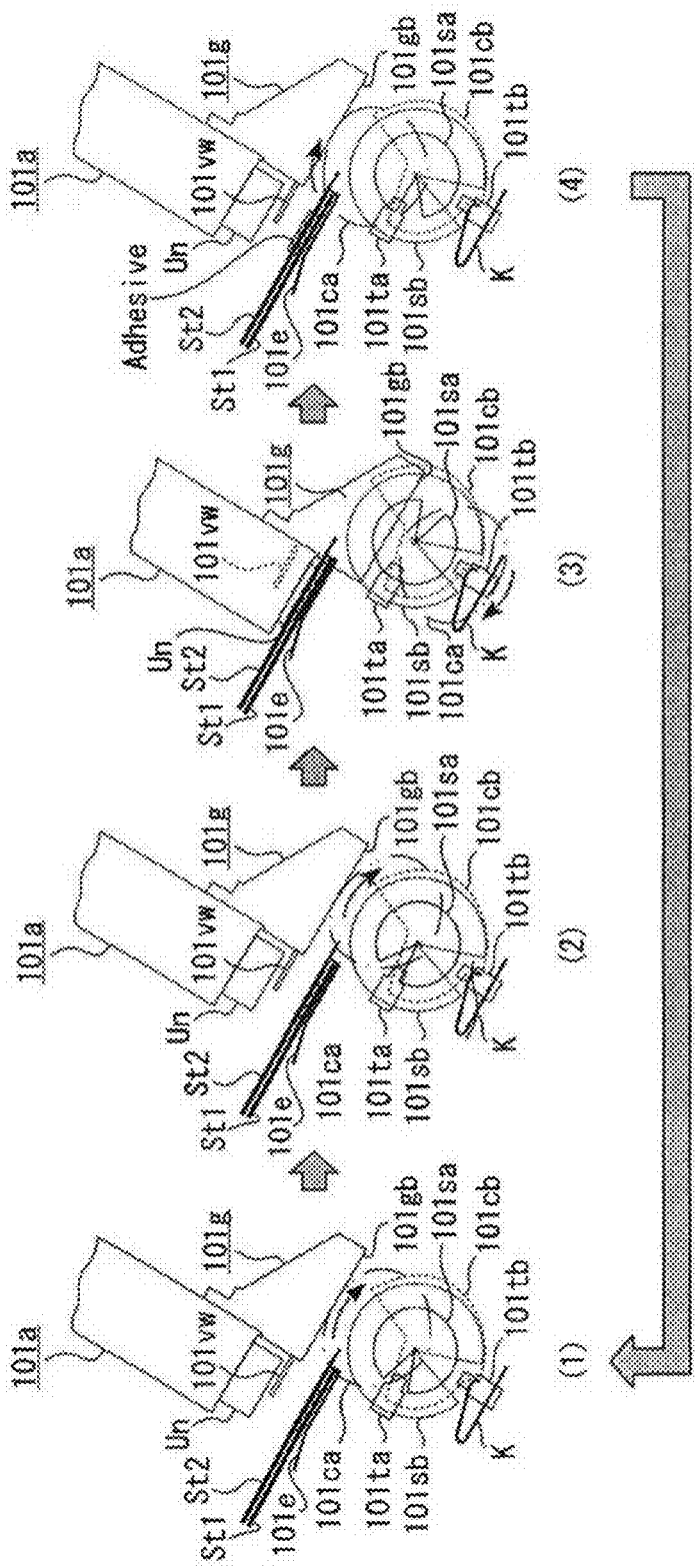
FIG. 18 illustrates a transition of each component of the binding unit when a pasting operation is performed on the second to the $(n-1)^{th}$ sheets.

FIG. 18 illustrates a transition of each component of the pasting unit 101 when a pasting operation is performed on the second to the $(n-1)^{th}$ sheets. Here, as an example, the pasting operation for the second sheet St2 will be described. A similar operation is also repeated for the third to the $(n-1)^{th}$ sheets. That is, the sheet binding device according to the embodiment performs binding on each sheet.

Subsequently, description will be made with regard to a pressing (crimping) operation (ACT 103) for a last sheet Stn of sheets to be bound (the $n^{th}$ sheet if the sheet bundle has n sheets).

Figure 19:
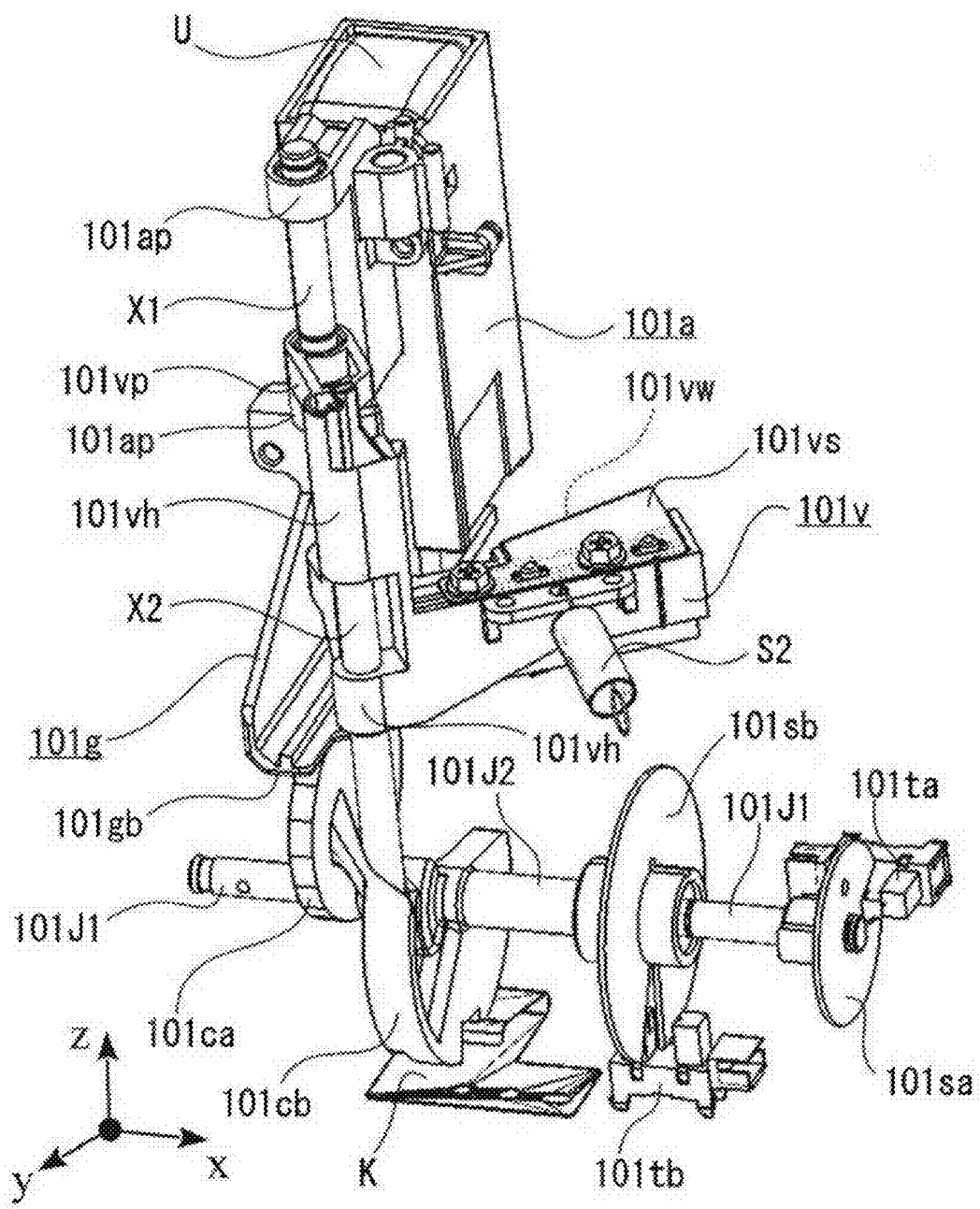
FIG. 19 is a perspective view of the binding unit when the holding unit is located at a "first retreat position" and a shutter member is located at a "second retreat position."
Figure 20:
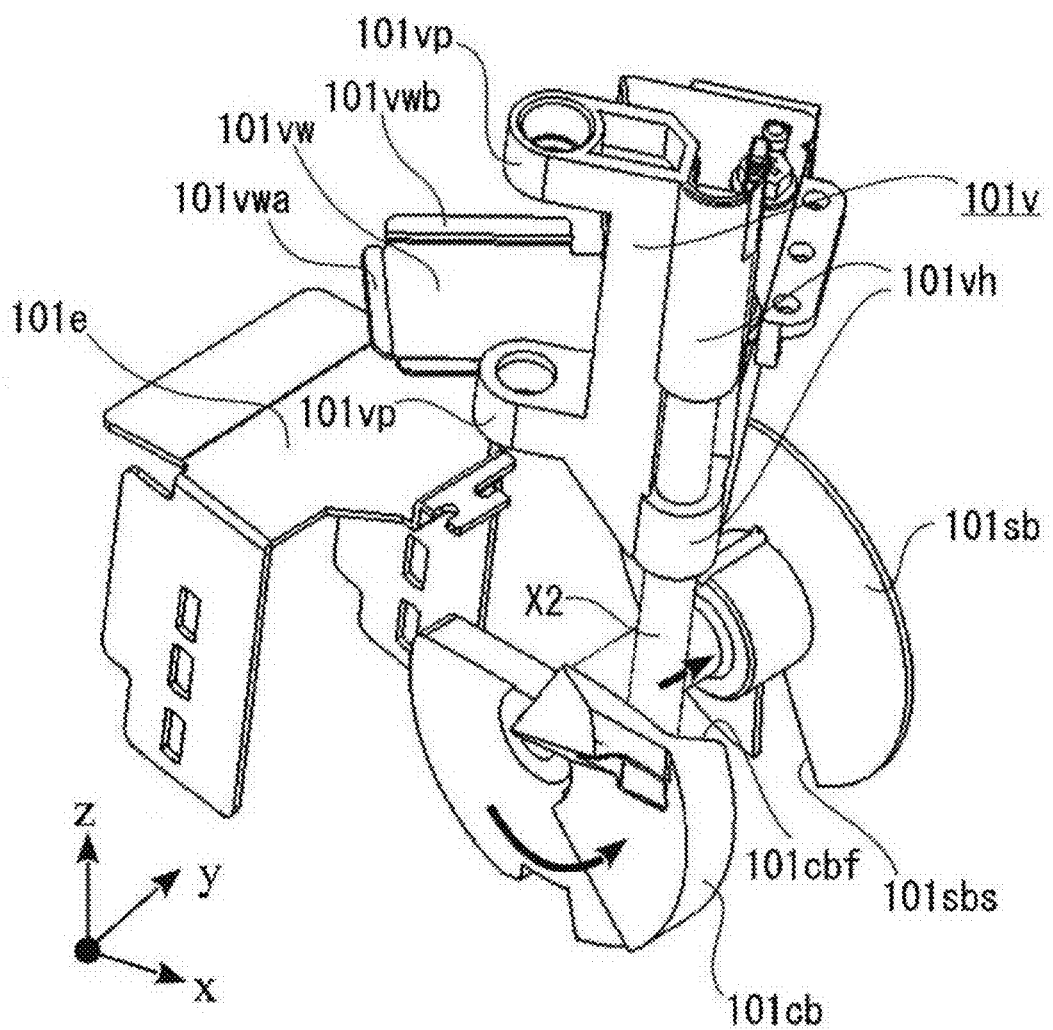
FIGS. 20-22 are each a perspective view of the binding unit to explain a rotary operation of a holding arm which is performed by an operation of a second cam.
Figure 21:
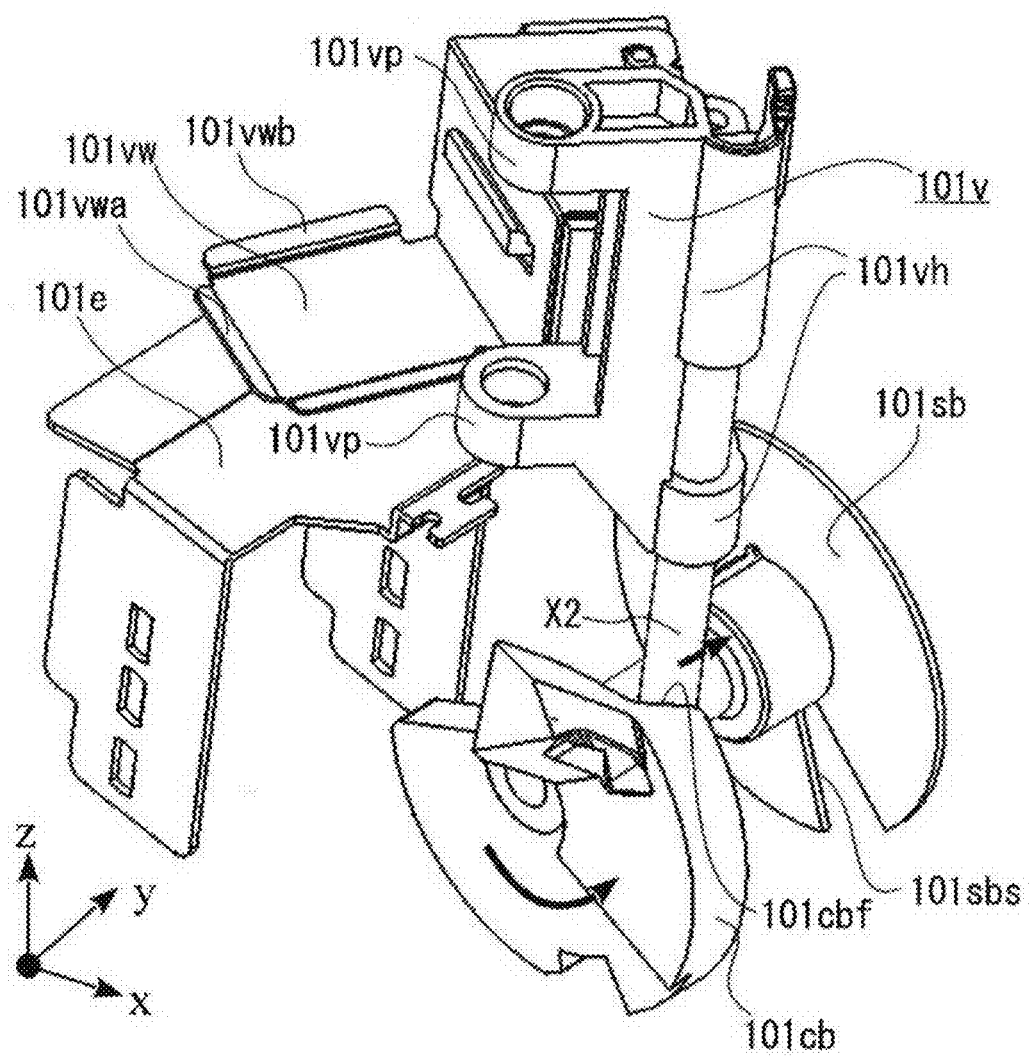
Figure 22:
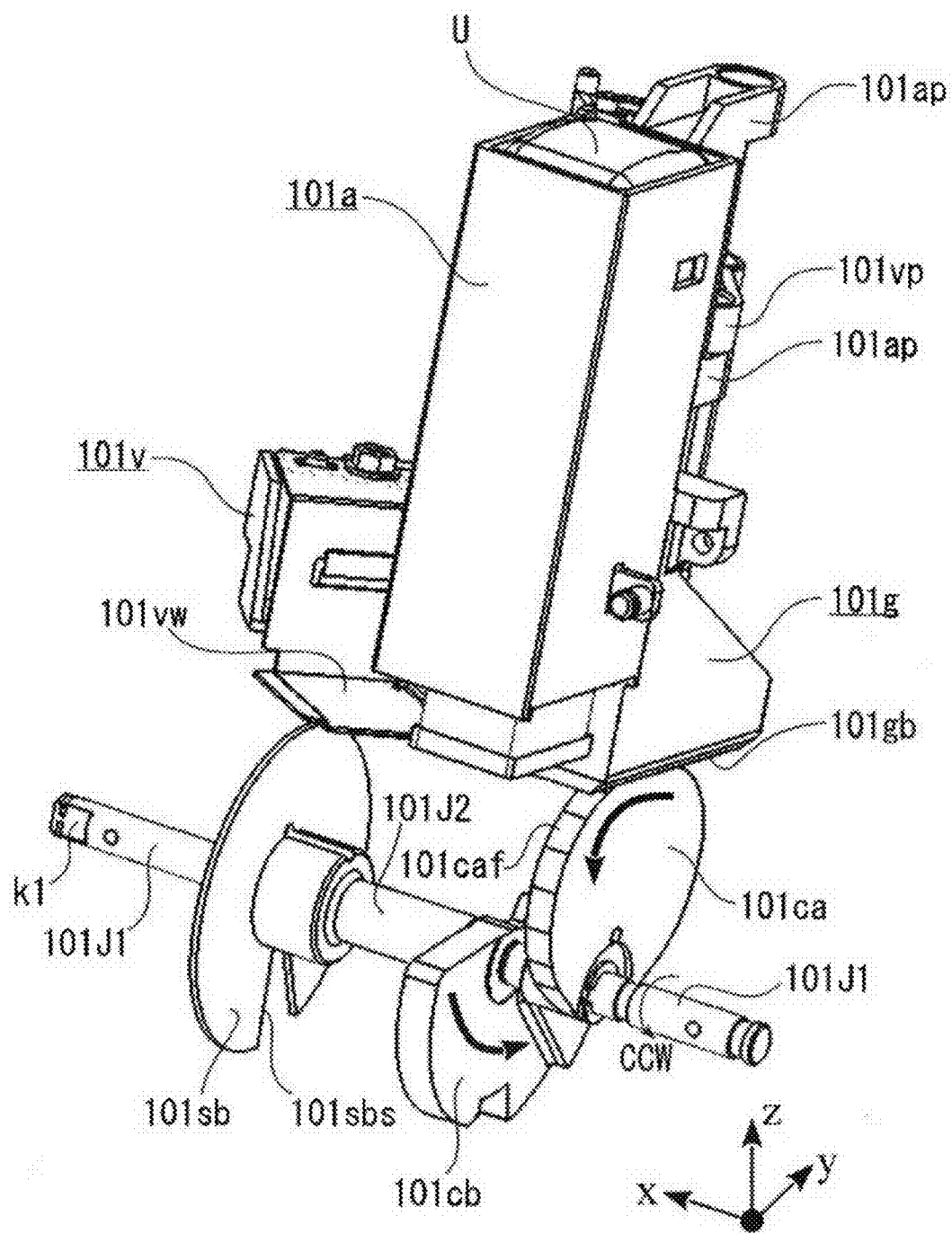
Figure 23:
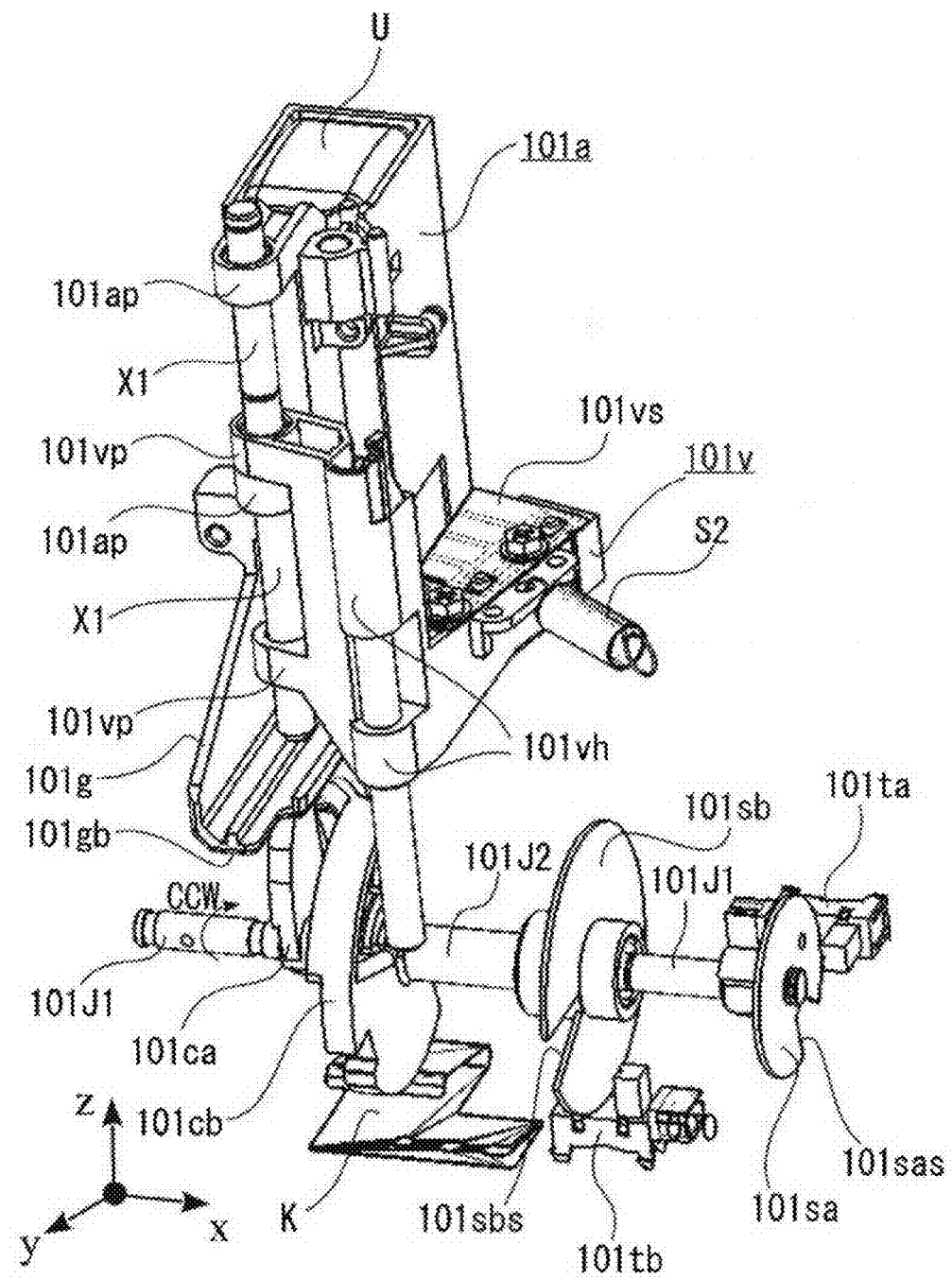
FIG. 23 is a perspective view of the binding unit when the shutter member is located at a "shielding position."
Figure 25:
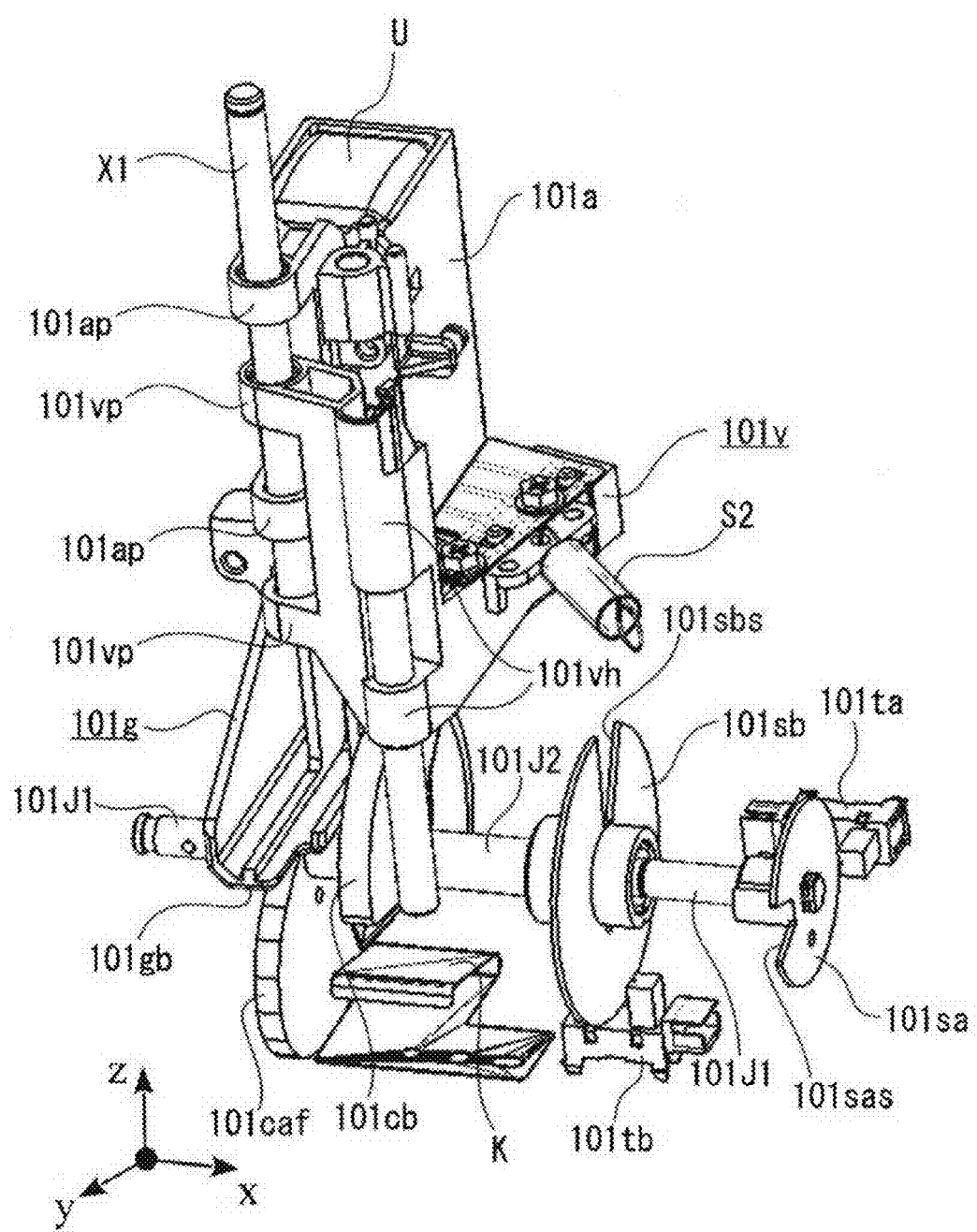
FIG. 25 is a perspective view of the binding unit when the holding unit is lowered to an "adhesive application position" while the shutter member is located at the "second retreat position."

FIG. 19 is a perspective view of the pasting unit 101 when the holding unit 101a is located at the "first retreat position" and the shutter member 101vw is located at the "second retreat position." In FIG. 19, since the shutter member 101vw is hidden by the holding arm 101v and thus is not visible (refer to FIG. 15), a position of the shutter member 101vw is illustrated by a dashed leader line. FIGS. 20 to 22 are perspective views of the pasting unit 101 to illustrate details of a rotary operation of the holding arm 101v which is performed by an operation of the second cam 101cb. FIGS. 23 and 24 are perspective views of the pasting unit 101 when the shutter member 101vw is located at the "shielding position." FIG. 25 is a perspective view of the pasting unit 101 when the holding unit 101a is lowered to the "adhesive application position" while the shutter member 101vw is located at the "second retreat position."

Figure 26:
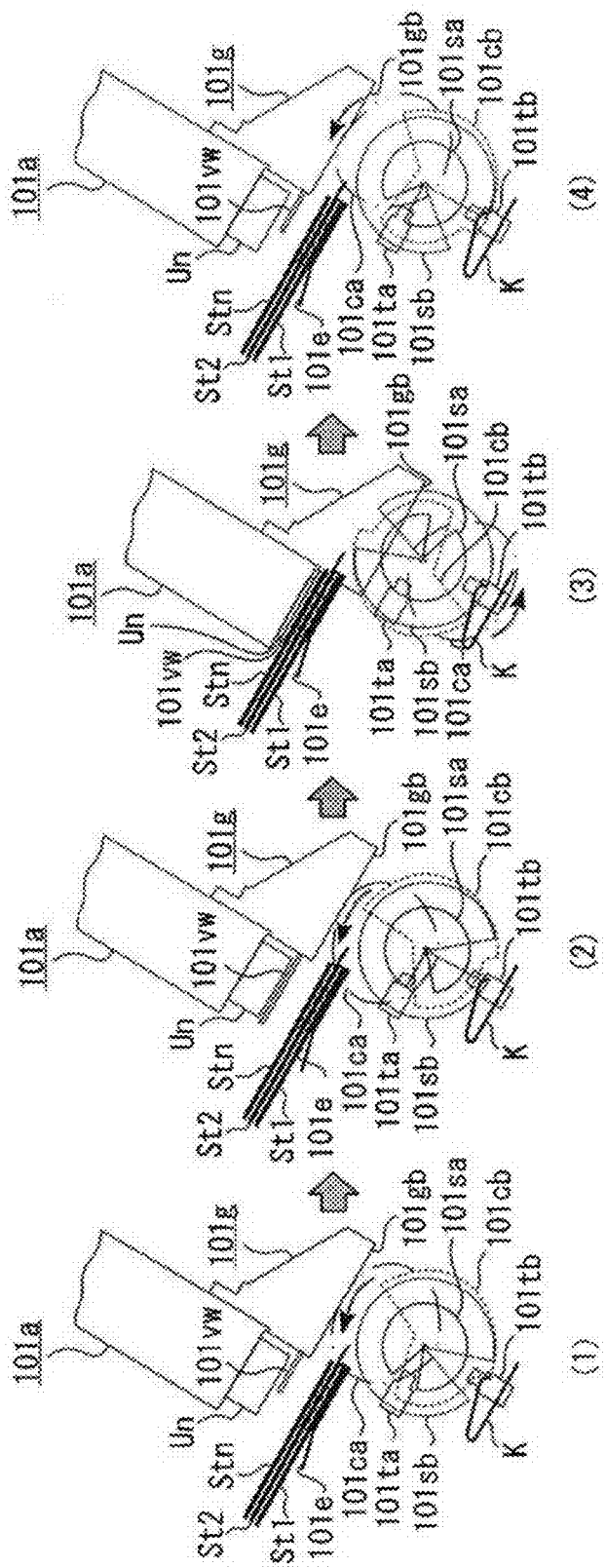
FIG. 26 illustrates a transition of each component of the binding unit when only pressing is performed on the last sheet.
Figure 27:
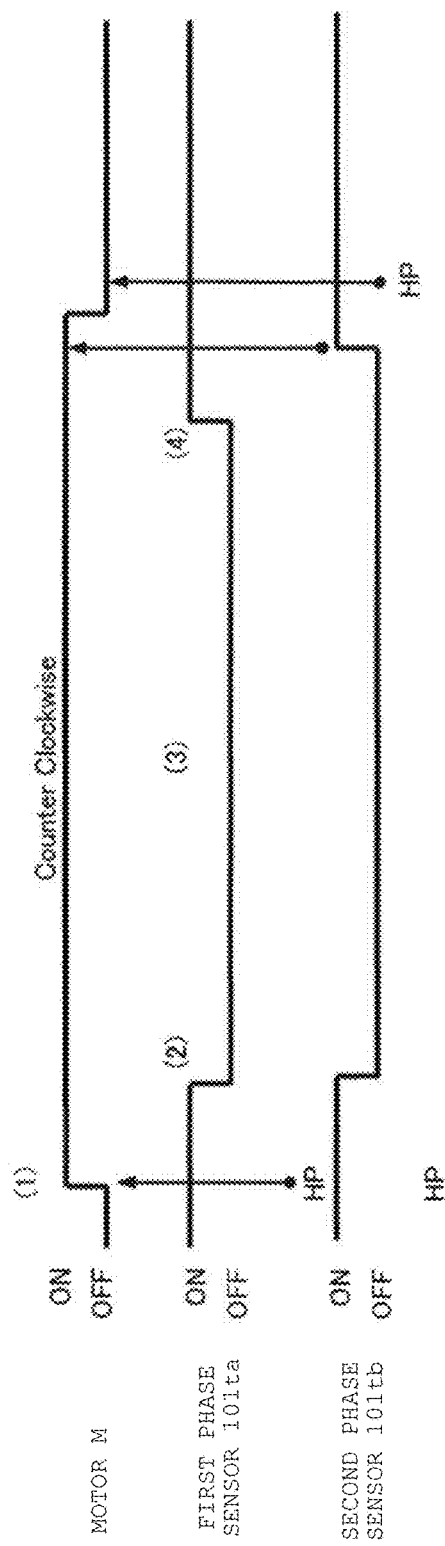
FIG. 27 is a timing chart illustrating a control operation performed by the CPU to process the last sheet.

FIG. 26 illustrates a transition of each component of the pasting unit 101 when only pressing is performed on the last sheet Stn. FIG. 27 is a timing chart illustrating drive control performed by the CPU 701 for processing the last sheet Stn.

As illustrated in FIGS. 19 to 22, if the first rotary shaft 101J1 is rotated in the counterclockwise direction (CCW) by the motor M, a rotational force applied to the first rotary shaft 101J1 is transmitted to the second rotary shaft 101J2 via a one-way clutch. The second cam surface 101*cbf* of the second cam 101*cb* rotating integrally with the second rotary shaft 101J2 that is rotated in the counterclockwise direction (CCW) in this way causes a tilted cam surface thereof to guide the guided shaft X2 so as to move in an arrow direction illustrated in FIGS. 20 and 21. In this way, when the second cam 101*cb* is rotated in the arrow direction CCW, the guided shaft X2 is moved along the second cam surface 101*cbf*, rotates the holding arm 101*v* against the tensile force of the tensile spring S2, and moves the shutter member 101*vw* toward the "shielding position" (refer to FIG. 22).

Since the first cam 101*ca* is fixed to the first rotary shaft 101J1, the first cam 101*ca* is also rotated in the counterclockwise direction in response to the rotation of the first rotary shaft 101J1 in the counterclockwise direction (CCW), which is performed by the motor M. As a result, the counterclockwise rotation of the first rotary shaft 101J1 causes the shutter member 101*vw* to move from the "second retreat position" to the "shielding position" as described above. The operation of the first cam surface 101*caf* causes the holding unit 101*a* to be lowered from the "first retreat position" to the "adhesive application position."

When the counterclockwise rotation of the first rotary shaft 101J1 causes the first cam 101*ca* and the second cam 101*cb* to be located at an angle position illustrated in FIG. 23, the shutter member 101*vw* reaches the "shielding position" below the adhesive application unit (refer to FIGS. 23, 24, and 26(2)).

If the shutter member 101*vw* reaches the "shielding position" and the first rotary shaft 101J1 is further rotated in the counterclockwise direction, as illustrated in FIG. 25, the holding unit 101*a* is further lowered toward the "adhesive application position" due to the operation of the first cam surface 101*caf* while the shutter member 101*vw* is located at the "shielding position" without any change. The holding unit 101*a* reaches the "adhesive application position" while pressing down the shutter member 101*vw* located at the "shielding position." Then, the holding unit 101*a* presses down the upper surface of the sheet (for example, the sheet Stn illustrated in FIG. 26(3)) located uppermost in the sheet bundle stacked on the processing tray 102.

If the first rotary shaft 101J1 is further rotated in the counterclockwise direction, the counterclockwise rotation of the second cam 101*cb* causes the second cam surface 101*cbf* to release restriction on the guided shaft X2. The tensile force of the tensile spring S2 causes the holding arm 101*v* to return to the position illustrated in FIG. 19. In addition, the operation of the first cam surface 101*caf* of the first cam 101*ca* rotating with the second cam 101*cb* in the counterclockwise direction causes the holding unit 101*a* to be pressed up toward the "first retreat position" against the tensile force of the tensile springs S11 and S12 (refer to FIG. 26(4)).

In this way, according to the embodiment, the CPU (control unit) 701 may operate in a "pasting mode" in which the first support mechanism moves the adhesive application unit U between the "adhesive application position" and the "first retreat position," and a "pressing mode" in which the first support mechanism moves the adhesive application unit U from the "first retreat position" to the "adhesive application position" while the second support mechanism moves the shutter member 101*vw* to the "shielding position," and the shutter member 101*vw* is pressed down in response to the movement of the adhesive application unit U to press the sheet (for example, the last sheet Stn illustrated in FIG. 26) stacked on the processing tray 102.

In this way, the adhesive applied sheet bundle is pressed via the shutter member 101*vw* with the pressing force of the adhesive application unit U for applying the adhesive to the sheet. Accordingly, a single pressing mechanism may perform both the adhesive application and the pressing operation.

Furthermore, during the "pasting mode", the CPU 701 (control unit) drives the motor M to rotate the first rotary shaft 101J1 in the second rotational direction (for example, the clockwise direction CW), and causes the first support mechanism to be moved by the rotational drive force transmitted from the first rotary shaft 101J1. In the "pressing mode" the CPU 701 drives the motor M to rotate the first rotary shaft 101J1 in the first rotational direction (for example, the counterclockwise direction CCW), causes the first support mechanism to be moved by the rotational drive force transmitted from the first rotary shaft 101J1, and the second support mechanism to be moved by the rotational drive force transmitted from the second rotary shaft 101J2.

In this way, the movement of the adhesive application unit U between the "adhesive application position" and the "retreat position" is caused by the rotational drive force transmitted from the first rotary shaft 101J1 to which the rotational drive force is always transmitted from the motor M regardless of the rotational direction of the motor M. Accordingly, even in either the "pasting mode" or the "pressing mode", the operation of the adhesive application unit U may be the same.

According to the embodiment, the CPU 701 (control unit) operates in the "pasting mode" in which the first support mechanism moves the adhesive application unit U between the "adhesive application position" and the "first retreat position", and in the "pressing mode" in which the first support mechanism moves the adhesive application unit U toward the "adhesive application position" while the second support mechanism moves the shutter member 101*vw* to the "shielding position", and the shutter member 101*vw* is pressed down in response to the movement of the adhesive application unit U to press the sheet stacked on the processing tray 102.

In this way, the guiding shaft X1 for guiding the adhesive application unit U in the first support mechanism between the "adhesive application position" and the "first retreat position" is used also as a rotation support shaft for supporting the shutter member 101*vw* in the second support mechanism so as to be rotatable between the "shielding position" and the "second retreat position." Accordingly, the adhesive application unit U and the shutter member 101*vw* can be moved by a simple configuration. In addition, the same shaft may also be employed as a guide for the movement of the shutter member 101*vw* caused by the movement of the adhesive application unit U to the "adhesive application position." Therefore, both the adhesive application unit U and the shutter member 101*vw* may be reliably and integrally slid on the same locus.

Subsequently, description will be made on a relationship among the adhesive application unit U, the holding unit 101*a*, and the shutter member 101*vw* when the shutter member 101*vw* presses down the upper surface of the sheet on the processing tray 102.

As illustrated in FIG. 20, the shutter member 101*vw* includes receiving units 101*vwa* and 101*vwb* which contact either one of the adhesive application unit U and the first support mechanism and receive a pressing force (tensile force of the tensile springs S11 and S12) toward the "adhesive application position" of the adhesive application unit U, when the adhesive application unit U is moved to the "adhesive application position" while the shutter member 101vw is located at the "shielding position."

The shutter member 101vw is formed in a shape such that the adhesive supplied from the adhesive application unit U does not contact the shutter member 101vw when the receiving units 101vwa and 101vwb are in contact with either one of the adhesive application unit U and the first support mechanism. Specifically, when the receiving units 101vwa and 101vwb are in contact with either one of the adhesive application unit U and the first support mechanism, a predetermined gap is secured between an adhesive supply portion Unp of the adhesive application unit U and the shutter member 101vw. Accordingly, the adhesive supplied from the adhesive supply portion Unp does not adhere to the shutter member 101vw.

As a result, the shutter member 101vw and the adhesive supplied from the adhesive application unit U do not contact each other when the shutter member 101vw presses the sheet bundle by the pressing force of the adhesive application unit U. Accordingly, it is possible to prevent the shutter member 101vw from being contaminated by the adhesive. Therefore, the adhesive which is adhered to the sheet is not likely to adhere to the shutter member 101vw.

Figure 28:
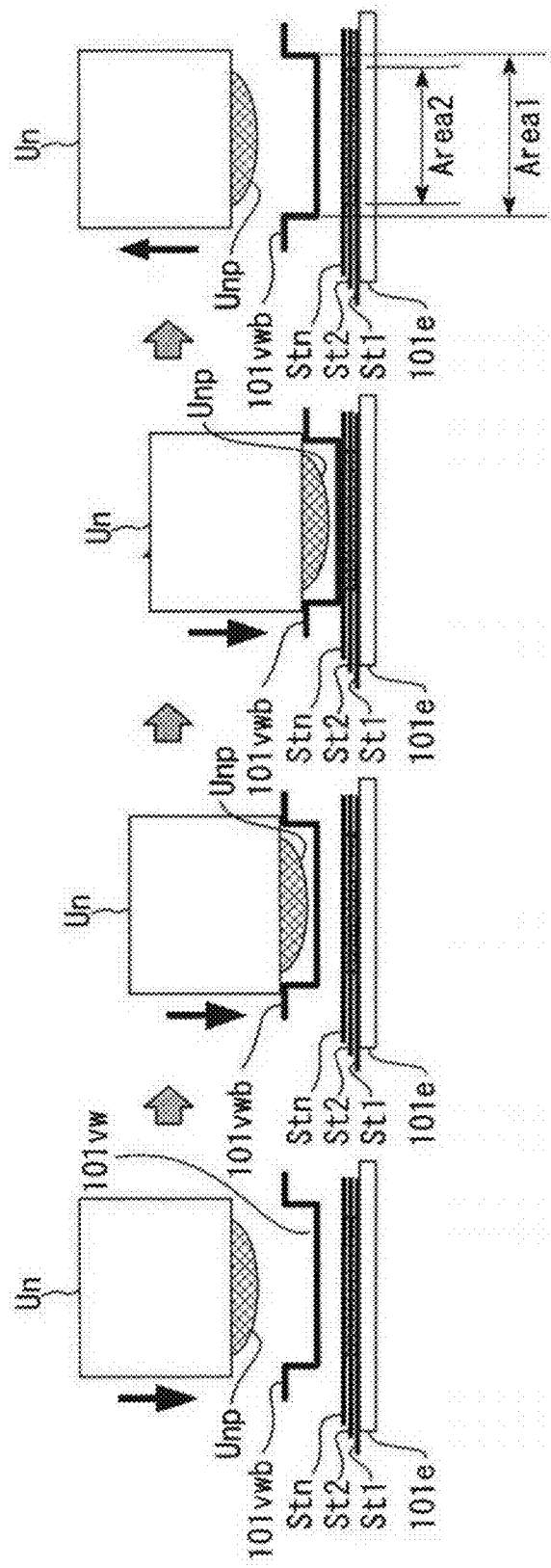
FIG. 28 is a side view of the shutter member during the sheet binding operation.

As illustrated in FIGS. 20 and 28, according to the present embodiment, a surface of the shutter member 101vw which is pressed against the upper surface of the sheet stacked on the processing tray 102 is formed in a convex shape toward the processing tray 102.

As a result, it is possible to increase pressure applied from the shutter member 101vw to the vicinity of the sheet pasting position, as compared to a case where the sheet is pressed by using a flat surface. Consequently, it is possible to more strongly and stably bond binding target sheets.

It is desirable that Area 1 where the shutter member 101vw comes into contact with the sheet when the shutter member 101vw presses the upper surface of the sheet stacked on the processing tray 102 includes at least Area 2 in which the adhesive is applied onto the sheet in a plane direction orthogonal to the movement direction of the adhesive application unit U.

Figure 29:
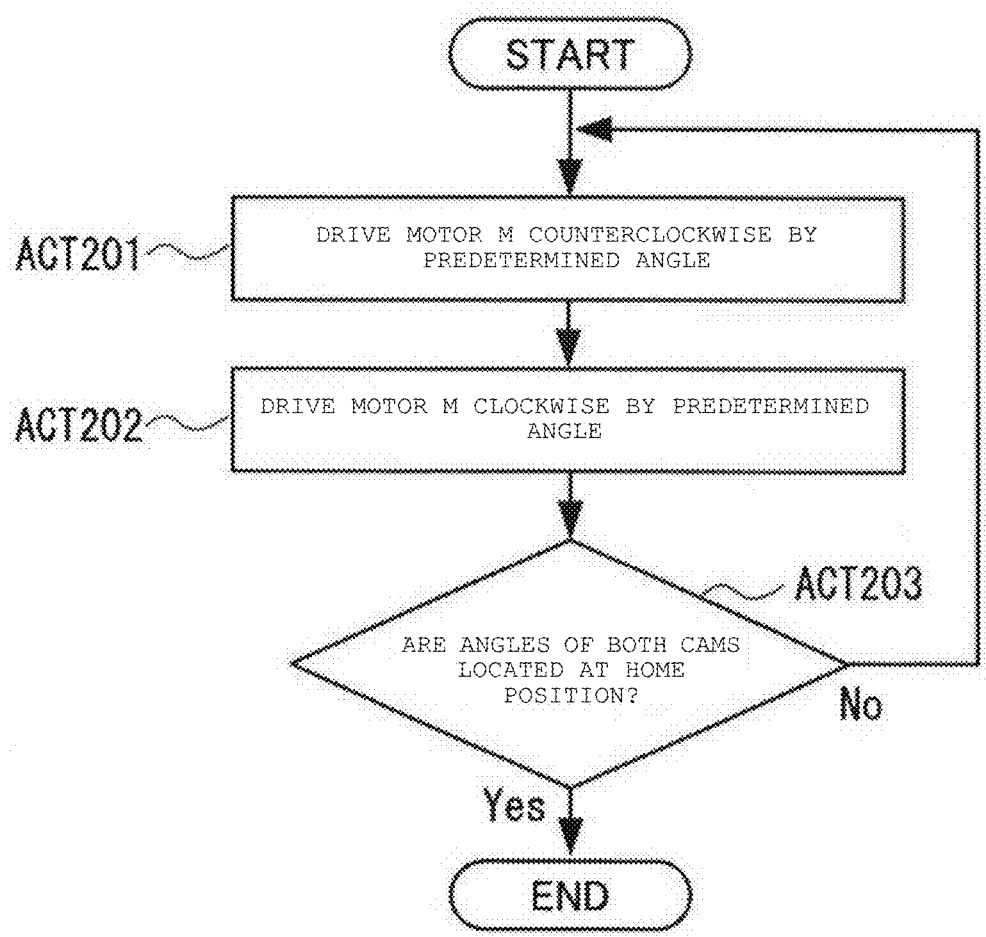
FIG. 29 is a flowchart illustrating a method of correcting deviation of an angle between the first cam and the second cam.
Figure 30:
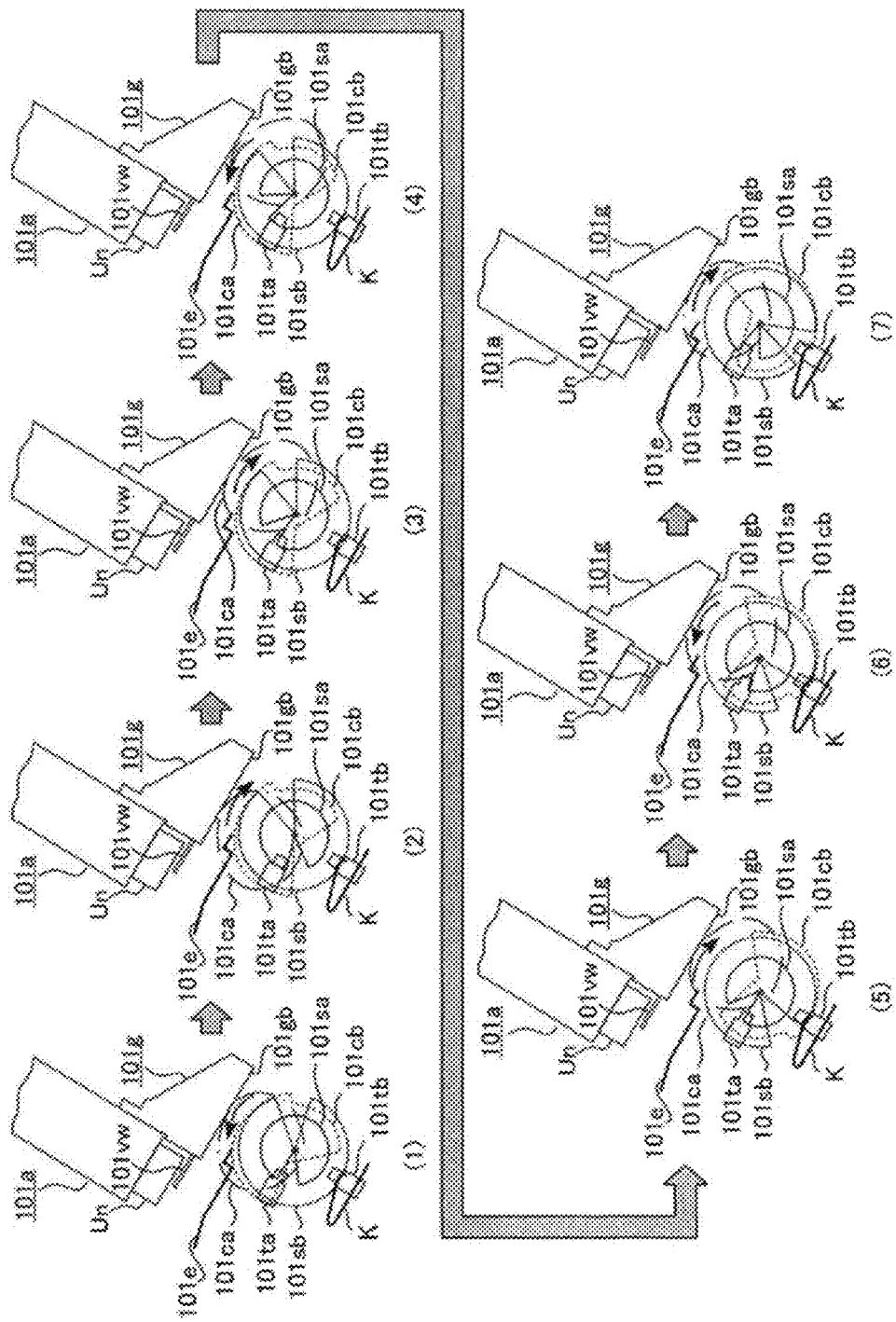
FIG. 30 is a transition diagram illustrating an operation of each member when the operation of the flowchart in FIG. 29 is performed.
Figure 31:
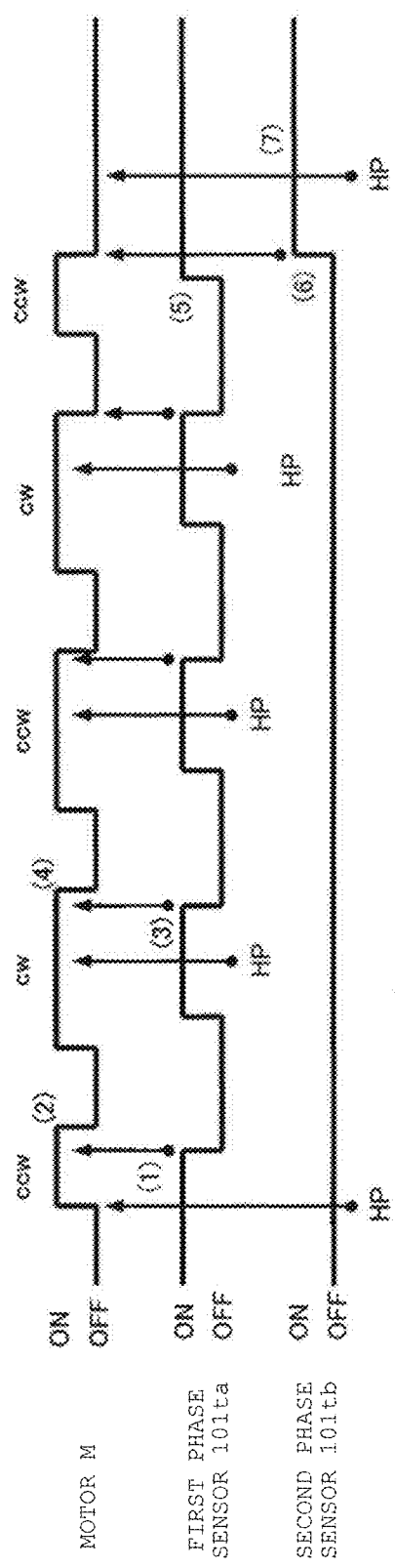
FIG. 31 is a timing chart of a control operation performed by the CPU when the operation of the flowchart in FIG. 29 is performed.

Next, description will be made with regard to a method of correcting deviation of a rotational angle between the first cam 101ca and the second cam 101cb. FIG. 29 is a flowchart illustrating a method of correcting deviation of the rotational angle between the first cam 101ca and the second cam 101cb. FIG. 30 illustrates an operation of each member of the pasting unit when the operation of the flowchart in FIG. 29 is performed. FIG. 31 is a timing chart of a control operation performed by the CPU 701 when the operation of the flowchart in FIG. 29 is performed.

According to the embodiment, in order to transmit power between the first rotary shaft 101J1 to which the first cam 101ca is fixed and the second rotary shaft 101J2 to which the second cam 101cb is fixed via a one-way clutch, the rotational angle between the first cam 101ca and the second cam 101cb may be deviated from a normal angle as the "pasting mode" during which the first rotary shaft 101J1 is rotated in the clockwise direction and the "pressing mode" during which the first rotary shaft 101J1 is rotated in the counterclockwise direction are alternately operated. This deviation from the normal angle between the first cam 101ca and the second cam 101cb may lead to timing deviation of a shielding operation performed by the shutter member 101vw when the adhesive application unit U is lowered to the "adhesive application position."

According to the embodiment, the pasting unit 101 includes a first phase detection member 101sa, a first phase sensor 101ta, a second phase detection member 101sb, and a second phase sensor 101tb.

As a flag for detecting the rotational angle of the first rotary shaft 101J1, the first phase detection member 101sa is disposed in an end portion k1 of the first rotary shaft 101J1 so as to be rotatable integrally with the first rotary shaft 101J1 (refer to FIG. 7). Specifically, the first phase detection member 101sa is a disc having a cutout portion 101sas formed therein, and allows detection light of an optical sensor to pass only through the cutout portion 101sas.

The first phase sensor 101ta is a light-transmitting-type optical sensor and disposed so as to be capable of detecting a state where the first phase detection member 101sa is located at a normal angle position. When the first phase detection member 101sa is located at the normal angle position, the cutout portion 101sas is in a state of allowing the detection light of the first phase sensor 101ta to pass therethrough.

As a flag for detecting the rotational angle of the second rotary shaft 101J2, the second phase detection member 101sb is disposed in an end portion of the second rotary shaft 101J2 so as to be rotatable integrally with the second rotary shaft 101J2 (refer to FIG. 7). Specifically, the second phase detection member 101sb is a disc having a cutout portion 101sbs formed therein, and allows the detection light of the optical sensor to pass only through the cutout portion 101sbs.

The second phase sensor 101tb is a light-transmitting-type optical sensor and disposed so as to be capable of detecting a state where the second phase detection member 101sb is located at a normal angle position. When the second phase detection member 101sb is located at the normal angle position, the cutout portion 101sbs allows the detection light of the second phase sensor 101tb to pass therethrough.

According to such a configuration, when the motor M rotates the first rotary shaft 101J1 in the first rotational direction and in the second rotational direction alternately and respectively by a predetermined angle (ACT 201 and ACT 202), the CPU 701 (phase adjustment unit) adjusts a phase of the rotational angle between the first rotary shaft 101J1 and the second rotary shaft 101J2 to a normal angle, based on a detection result of the first phase sensor 101ta and the second phase sensor 101tb (ACT 203).

According to the present embodiment, the one-way clutch is employed in order to transmit the drive force between the first rotary shaft 101J1 and the second rotary shaft 101J2. Accordingly, the first rotary shaft 101J1 is rotated in the first rotational direction and in the second rotational direction alternately and respectively by a predetermined angle (for example, a top dead center range of the first cam 101ca). In this manner, it is possible to change the phase of the angle between the first rotary shaft 101J1 and the second rotary shaft 101J2.

Therefore, if the first phase detection member 101sa and the second phase detection member 101sb may detect whether or not the first rotary shaft 101J1 and the second rotary shaft 101J2 have a correct relative angle, the angle between the first rotary shaft 101J1 and the second rotary shaft 101J2 may become the normal angle by alternatively repeating forward and reverse rotation as illustrated by (1) to (7) in FIGS. 30 and 31 (ACT 203).

Each operation in the processing performed by the above-described sheet binding device is achieved by causing the CPU 701 to execute a sheet binding program stored in the memory 703.

According to the first embodiment, for example, it is possible to provide a sheet binding device having the following configurations.

(1) A sheet binding device includes an adhesive application unit that causes an adhesive for bonding sheets to adhere to the sheets, a processing tray on which an adhesive target sheet is stacked, a first support mechanism that supports the adhesive application unit so as to be movable between an adhesive application position for causing the adhesive to adhere to a surface of the sheet while pressing the surface of the sheet stacked on the processing tray and a first retreat position retreating to a position which does not interfere with a sheet stacking operation on the processing tray, a shutter member that is interposed between the adhesive application unit and the sheet stacked on the processing tray so as to interfere with adhesive applying performed by the adhesive application unit to the sheet, a second support mechanism that supports the shutter member so as to be movable between a shielding position for supporting the shutter member so as to be movable toward the surface of the sheet by being interposed between the adhesive application unit and the sheet stacked on the processing tray and by following a pressing operation of the adhesive application unit moving toward the adhesive application position and a second retreat position retreating from a movement locus of the adhesive application unit, and a control unit that may execute a pasting mode in which the first support mechanism moves the adhesive application unit between the adhesive application position and the first retreat position and a pressing mode in which in a state where the second support mechanism moves the shutter member to the shielding position, the first support mechanism moves the adhesive application unit from the first retreat position to the adhesive application position, and the shutter member pressed down due to the movement of the adhesive application unit presses the sheet on the processing tray.

(2) The sheet binding device according to (1) further includes a motor, a first rotary shaft to which a rotation drive force is transmitted from the motor, and a second rotary shaft that is rotated by the rotation drive force being transmitted from the first rotary shaft via a one-way clutch if the first rotary shaft is rotated in a first rotation direction, and to which the rotation drive force is not transmitted from the first rotary shaft if the first rotary shaft is rotated in a second rotation direction opposite to the first rotation direction. In the pasting drive mode, the control unit causes the motor to rotatably drive the first rotary shaft in the second rotation direction, and drives the first support mechanism by using the rotation drive force transmitted from the first rotary shaft. In the pressing mode, the control unit causes the motor to rotatably drive the first rotary shaft in the first rotation direction, drives the first support mechanism by using the rotation drive force transmitted from the first rotary shaft, and drives the second support mechanism by using the rotation drive force transmitted from the second rotary shaft.

(3) In the sheet binding device according to (2), the first support mechanism includes a first cam connected to the first rotary shaft, and moves the adhesive application unit between the retreat position and the adhesive application position by using the rotation of the first cam which rotates integrally with the first rotary shaft.

(4) In the sheet binding device according to (3), the adhesive application unit is elastically urged in a direction from the retreat position toward the adhesive application position by using a spring.

(5) In the sheet binding device according to any one of (2) to (4), the second support mechanism includes a second cam connected to the second rotary shaft, and moves the shutter member between the second retreat position and the shielding position by using the rotation of the second cam which rotates integrally with the second rotary shaft.

(6) In the sheet binding device according to any one of (2) to (4), the second support mechanism includes a gear train which receives the rotation drive force transmitted from the second rotary shaft, and moves the shutter member between the second retreat position and the shielding position by using the gear train which receives the rotation drive force of the second rotary shaft.

(7) The sheet binding device according to any one of (2) to (6) further includes a first phase detection member that serves as a flag for detecting a rotation angle position of the first rotary shaft, and that is disposed so as to be rotatable integrally with the first rotary shaft, a first phase sensor that is disposed so as to be capable of detecting a state where the first phase detection member is located at a normal angle position, a second phase detection member that serves as a flag for detecting a rotation angle position of the second rotary shaft, and that is disposed so as to be rotatable integrally with the second rotary shaft, a second phase sensor that is disposed so as to be capable of detecting a state where the second phase detection member is located at a normal angle position, and a phase adjustment unit that adjusts a phase of the rotation angle position between the first rotary shaft and the second rotary shaft to a normal state, based on a detection result of the first phase sensor and the second phase sensor, when the motor rotates the first rotary shaft in the first rotation direction and in the second rotation direction alternately and respectively by a predetermined angle.

According to the first embodiment, for example, it is possible to provide a sheet binding device having the following configurations.

(1) A sheet binding device includes an adhesive application unit that causes an adhesive for bonding sheets to adhere to the sheets, a processing tray on which an adhesive target sheet is stacked, a first support mechanism that supports the adhesive application unit so as to be slidingly movable along a predetermined guiding shaft between an adhesive application position for causing the adhesive to adhere to a surface of the sheet while pressing the sheet stacked on the processing tray and a first retreat position retreating to a position which does not interfere with a sheet stacking operation on the processing tray, a shutter member that is interposed between the adhesive application unit and the sheet stacked on the processing tray so as to interfere with adhesive applying performed by the adhesive application unit to the sheet, a second support mechanism that supports the shutter member so as to be rotatable about the guiding shaft as a fulcrum between a shielding position for supporting the shutter member so as to be movable toward the surface of the sheet along the guiding shaft by being interposed between the adhesive application unit and the sheet stacked on the processing tray and by following a pressing operation of the adhesive application unit moving toward the adhesive application position and a second retreat position retreating from a movement locus of the adhesive application unit, and a control unit that may perform a pasting mode in which the first support mechanism moves the adhesive application unit between the adhesive application position and the first retreat position and a pressing mode in which in a state where the second support mechanism moves the shutter member to the shielding position, the first support mechanism moves the adhesive application unit from the first retreat position to the adhesive application position, and the shutter member pressed down due to the movement of the adhesive application unit presses the sheet on the processing tray.

(2) In the sheet binding device according to (1), when moving the shutter member to the shielding position, the second support mechanism supports the shutter member at a high position where the shutter member does not come into contact with the uppermost sheet among sheets stacked on the processing tray, even if the maximum number of stackable sheets is stacked on the processing tray.

(3) In the sheet binding device according to (1) or (2), the shutter member includes a receiving unit which receives a pressing force acting toward the adhesive application position of the adhesive application unit by coming into contact with any one of the adhesive application unit and the first support mechanism, when the adhesive application unit is moved to the adhesive application position. When the receiving unit is in contact with any one of the adhesive application unit and the first support mechanism, the adhesive supplied from the adhesive application unit does not come into contact with the shutter member.

(4) In the sheet binding device according to (3), a surface on the shutter member side which is pressed against an upper surface of the sheet stacked on the processing tray is formed in a convex shape toward the processing tray side.

(5) In the sheet binding device according to (4), a region of the shutter member which comes into contact with the sheet when the shutter member is pressed against the upper surface of the sheet stacked on the processing tray includes at least a region for applying the adhesive to the sheet in a plane direction orthogonal to a movement direction of the adhesive application unit.

Second Embodiment

A second embodiment will be described hereinafter.

The second embodiment is a modification example of the above-described first embodiment. The second embodiment has a rotary paddle which hits and drops a sheet on the processing tray 102, and is different from that of the first embodiment. Hereinafter, in the second embodiment, the same reference numerals are used for elements having the same functions as those in the first embodiment, and description thereof will be omitted.

Figure 32:
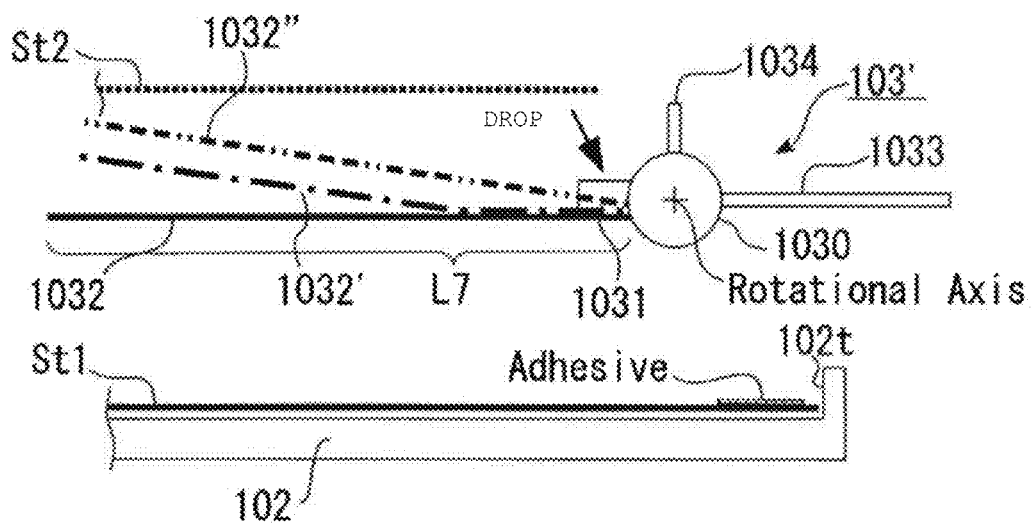
FIG. 32 is a side view of a rotary paddle in a binding unit of a post-processing apparatus according to a second embodiment.

FIG. 32 is a side view of a rotary paddle 103' according to the second embodiment. The rotary paddle 103' according to the second embodiment includes a rotary shaft 1030, a temporary support portion 1031 disposed on an outer peripheral surface of the rotary shaft 1030, a first rotary paddle 1034, a second rotary paddle 1033, and an abutting auxiliary member 1032.

The temporary support portion 1031, the first rotary paddle 1034, and the second rotary paddle 1033 are disposed on the outer peripheral surface of the rotary shaft 1030 at a predetermined interval in a circumferential direction, and are disposed upright so as to respectively protrude outward in a radial direction of the rotary shaft 1030 from the outer peripheral surface of the rotary shaft 1030. As illustrated in FIG. 32, the abutting auxiliary member 1032 is fixed to a side surface on a downstream side of the temporary support portion 1031 in the rotational direction of the rotary paddle 103.

The temporary support portion 1031 has a role of supporting a lower surface of a tip end of a processing target sheet temporarily stacked on a temporary tray from below (refer to FIG. 32). Specifically, the temporary support portion 1031 supports the lower surface of the tip end of the sheet temporarily stacked on the temporary tray from below at an angle position (home position) illustrated in FIG. 32.

The second rotary paddle 1033 is formed of an elastic member which rotates integrally with the rotary shaft 1030. As illustrated in FIGS. 33 to 36, the second rotary paddle 1033 rotates in a rotational direction d7, while being in contact with the upper surface of the sheet dropped on the processing tray 102 from the temporary tray. The second rotary paddle 1033 transports the sheet through the above-described operation, and causes the tip end of the sheet to abut to a predetermined abutting alignment position 102t in the processing tray 102.

The abutting auxiliary member 1032 is a film (for example, a polyester film) having capability of releasing from an adhesive that is superior to that of the binding target sheet.

The abutting auxiliary member 1032 is disposed in the rotary shaft 1030 which is the same as the rotary shaft to which the first rotary paddle 1034 and the second rotary paddle 1033 are fixed. A length L7 (refer to FIG. 32) of the abutting auxiliary member 1032 is set to a length which satisfies a predetermined condition when the sheet is transported toward the abutting alignment position by the second rotary paddle 1033. Specifically, the length L7 of the abutting auxiliary member 1032 is set as the length which causes a tip end of a sheet St2 to be disposed between a tip end portion of the abutting auxiliary member 1032 and the second rotary paddle 1033, until at least the tip end of the sheet (St2 in FIG. 35) rides on an adhesive area applied onto an immediately prior sheet (St1 in FIG. 35), when the sheet is transported toward the abutting alignment position by the second rotary paddle 1033 (refer to FIG. 35).

Next, an operation of the rotary paddle 103' according to the second embodiment will be described with reference to FIGS. 32 to 37.

Figure 33:
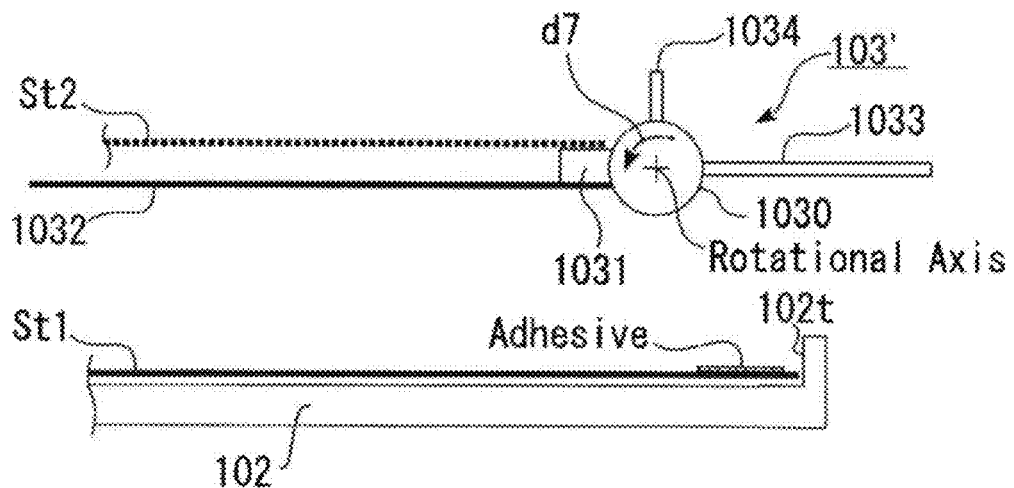
FIGS. 33-37 illustrate a transition of the rotary paddle according to the second embodiment.

The sheet St2 drops onto the temporary tray, and the lower surface of the tip end is supported by the temporary support portion 1031 (FIGS. 32 and 33). When the sheet St2 stacked on the temporary tray is dropped onto the sheet St1 stacked on the processing tray 102, the CPU 701 drives the motor M' to rotate the rotary shaft 1030 in the rotational direction illustrated in FIG. 33, releases the sheet supported by the temporary support portion 1031, and allows the sheet to drop onto the processing tray 102 (refer to FIG. 34). Here, it is assumed that pasting has been performed on a predetermined area on the upper surface of the sheet St1 by the adhesive application unit U (refer to FIG. 34). At this time, the tip end of the sheet St2 loaded onto the processing tray 102 is placed on the upper surface of the abutting auxiliary member 1032 in a state of being pressed against the upper surface of the sheet stacked on the processing tray 102 (refer to FIG. 34).

Figure 34:
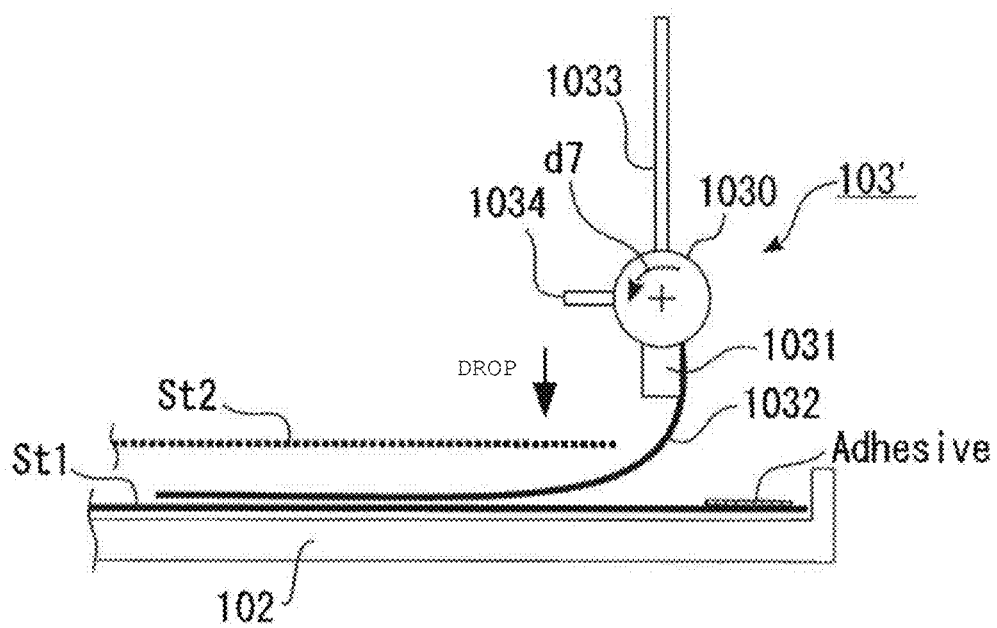

If the rotary shaft 1030 is further rotated in the rotational direction d7, the abutting auxiliary member 1032 slides on the sheet toward a pasting area on the sheet while being pressed against the upper surface of the sheet stacked on the processing tray 102 (refer to FIG. 34).

Figure 35:
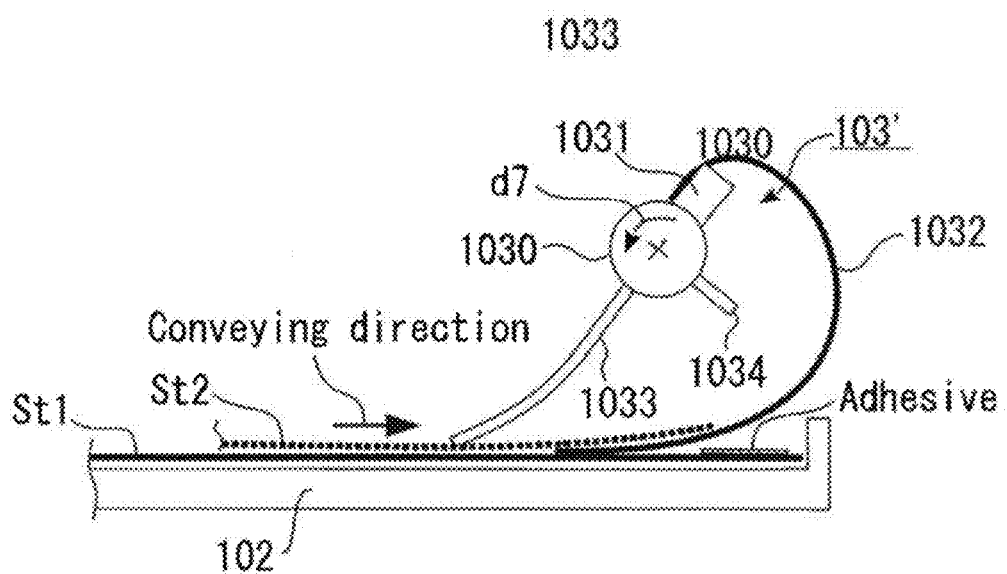

Then, if in a state illustrated in FIG. 34, the rotary shaft 1030 is further rotated in the rotational direction d7, subsequently to the abutting auxiliary member 1032, the second rotary paddle 1033 contacts the upper surface of the sheet St2 stacked on the processing tray 102 (refer to FIG. 35). That is, the second rotary paddle 1033 transports the sheet St2 in a state where the tip end of the sheet St2 is placed on the abutting auxiliary member 1032.

Figure 36:
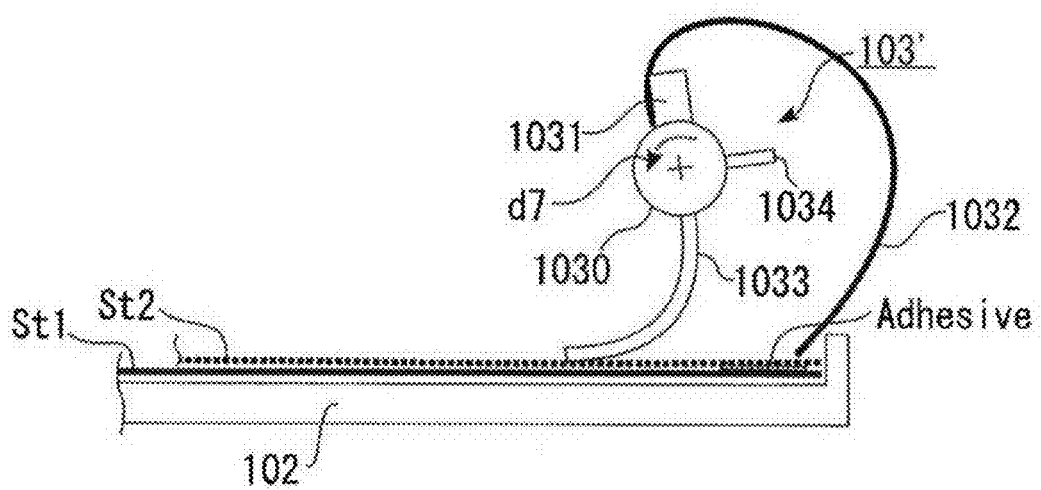
Figure 37:
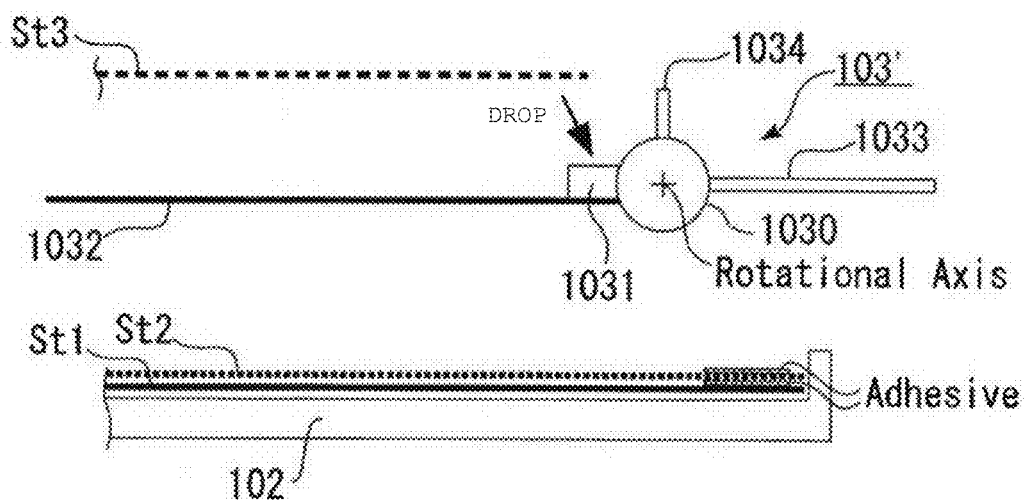

Then, if the rotary shaft 1030 is further rotated in the rotational direction d7 in the position illustrated in FIG. 34, the sheet St2 to be transported to the abutting position of the processing tray 102 by the second rotary paddle 1033 passes a pasting portion while the tip end rides on the abutting auxiliary member 1032, and abuts onto the abutting position of the processing tray 102 (refer to FIG. 36). If the tip end of the sheet St2 rides on the pasting portion, the abutting auxiliary member 1032 retreats from a portion between the sheet St2 and the pasting portion, and is separated from the upper portion of the processing tray 102 (refer to FIG. 36).

If the pasting is performed on the upper surface of the sheet St2 abutting onto the predetermined abutting position of the processing tray 102 (refer to FIG. 37), the CPU 701 drops a sheet St3 to be subsequently stacked on the processing tray 102 onto the temporary tray and the temporary support portion 1031. The subsequent transport operation and pasting operation for the sheet St3 are the same as those for the above-described sheet St2.

As described above, the abutting auxiliary member 1032 is disposed between the tip end of the sheet and the adhesive application area on the sheet stacked immediately before, until the tip end of the sheet transported by the second rotary paddle 1033 rides on the adhesive application area on the sheet stacked on the processing tray 102 immediately before. As a result, the tip end of the sheet transported by the second rotary paddle 1033 is not likely to contact the adhesive on the sheet stacked immediately before and caught by the adhesive.

The abutting auxiliary member may be disposed in the rotary shaft 1030 so as to be intermediately bent toward the upstream side in the rotational direction of the rotary paddle 103' as compared to the radial direction of the rotary shaft 1030 (refer to an abutting auxiliary member 1032' illustrated by a dashed line in FIG. 32). As a matter of course, without being limited to a configuration of being intermediately bent, a range from the base end portion to the tip end portion may entirely or partially have a bent shape so as to draw a gentle arc.

According to this configuration, when the sheet is transported toward the abutting alignment position by the second rotary paddle 1033, the sheet is likely to be transported, and the sheet dropping from the temporary tray is not likely to be prevented from being stacked on the processing tray 102.

Alternatively, the abutting auxiliary member may extend so as to tilt from the base end portion in the radial direction of the rotary shaft 1030 (refer to an abutting auxiliary member 1032 illustrated by a two-dot chain line in FIG. 32). That is, instead of extending in the radial direction of the rotary shaft 1030 from the base end portion of the abutting auxiliary member located on the outer peripheral surface of the rotary shaft 1030, the abutting auxiliary member may extend obliquely in a direction tilting toward the upstream side in the rotational direction of the rotary paddle 103' with respect to the radial direction of the rotary shaft 1030.

According to such a configuration, when the sheet is transported toward the abutting alignment position by the second rotary paddle 1033, the sheet dropping from the temporary tray is not likely to be prevented from being stacked on the processing tray 102.

Figure 38:
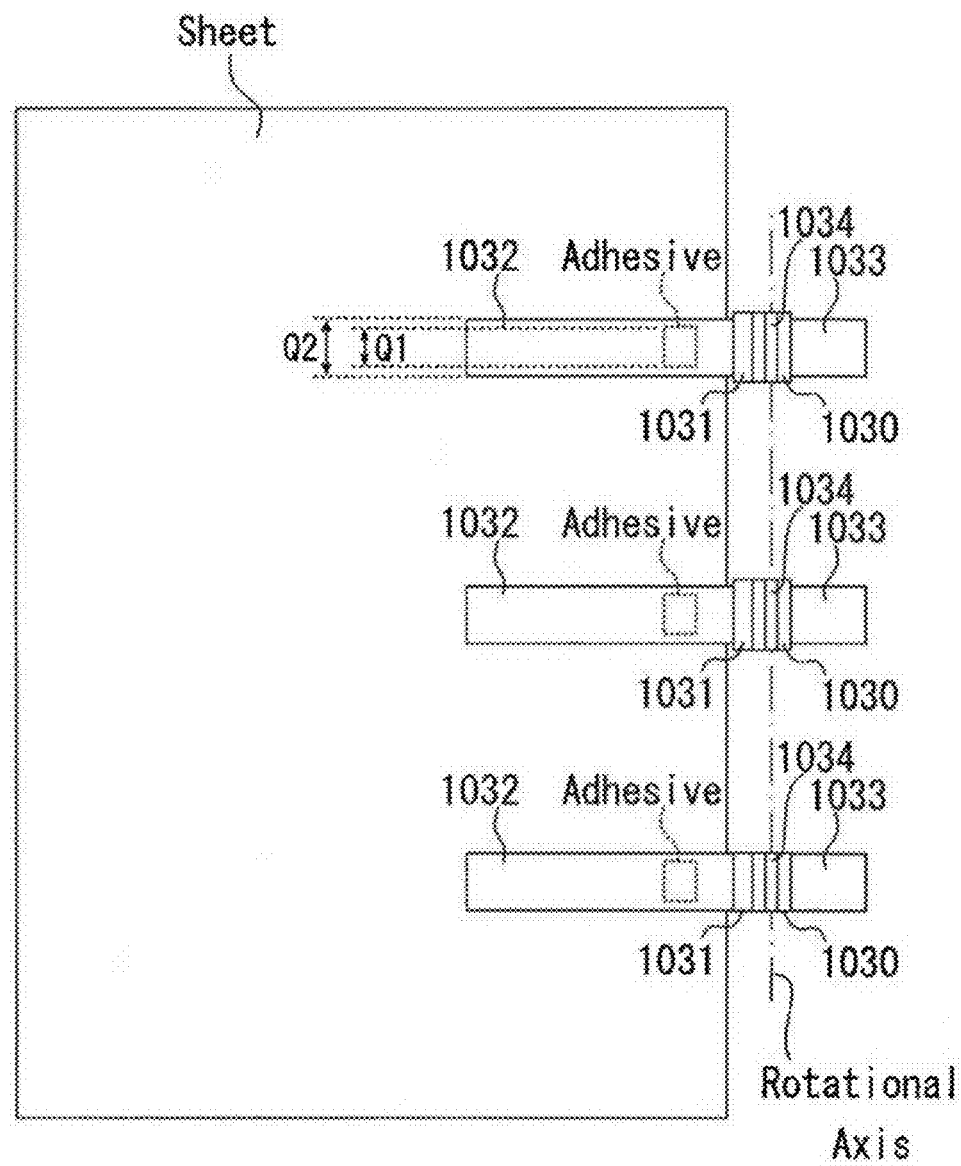
FIGS. 38 and 39 are each a plan view of the rotary paddle and an abutment auxiliary member in the binding unit.

The abutting auxiliary member according to the embodiment is disposed at a position corresponding to an adhesive application area Q1 of the adhesive application unit U in a direction of a rotational axis (dashed line illustrated in FIG. 38) of the rotary shaft 1030, for example. Here, the abutting auxiliary member is set so that the width in the direction of the rotational axis is wider than the width of the adhesive application area Q1 on the sheet (refer to Q2 illustrated in FIG. 38). According to this configuration, when the subsequent sheet is transported from a standby tray to a processing tray, it is possible to prevent the subsequent sheet from contacting the adhesive on the sheet previously stacked on the processing tray.

Figure 39:
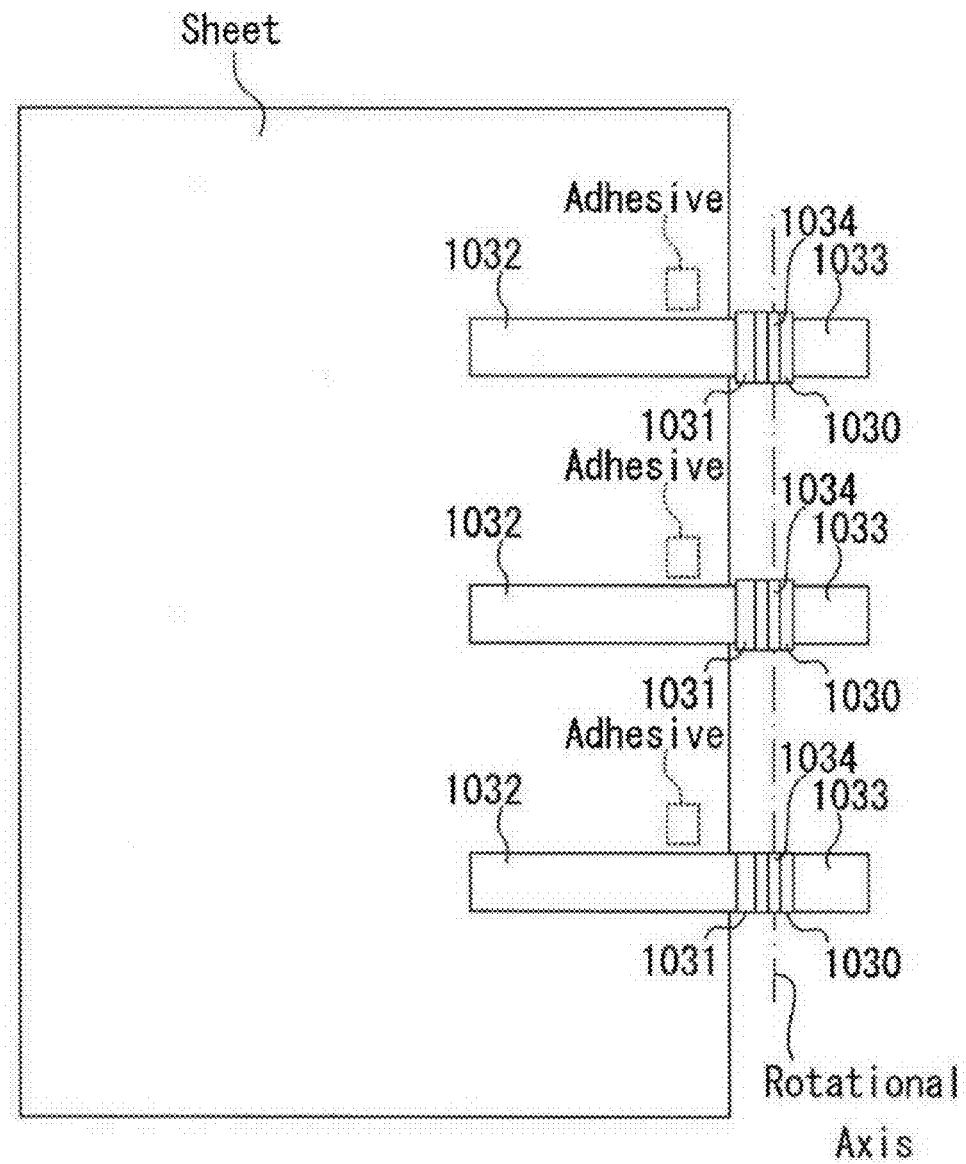

As a matter of course, the abutting auxiliary member 1032 is not necessarily disposed so as to overlap the adhesive application area. The abutting auxiliary member 1032 may be at least disposed between the tip end of the sheet and the pasting portion to an extent that the tip end of the sheet does not contact the pasting portion and is not caught by an adhesive on the pasting portion, when the sheet is transported toward the abutting position by the second rotary paddle 1033. Accordingly, for example, as illustrated in FIG. 39, the abutting auxiliary member may be disposed so that the position of the abutting auxiliary member and the position of the adhesive application area of the adhesive application unit U do not overlap each other in the direction of the rotational axis of the rotary shaft 1030.

According to the second embodiment, it is possible to provide a sheet binding device having the following configurations.

(1) A sheet binding device includes a processing tray on which a binding target sheet is stacked, a temporary tray that is disposed above the processing tray, on which the transported sheet is temporarily stacked, and that drops the temporarily stacked sheet on to the processing tray, a rotary paddle that causes the sheet to abut onto a predetermined abutting alignment position in the processing tray by rotating while coming into contact with an upper surface of the sheet dropping onto the processing tray from the temporary tray, an adhesive application unit that applies an adhesive to a predetermined area on the upper surface of the sheet abutting onto the abutting alignment position, and an abutting auxiliary member that is disposed in a rotary shaft which is the same as that of the rotary paddle, and that has a length so that a tip end of the sheet is interposed between a tip end of the abutting auxiliary member and the rotary paddle during a time until the tip end of the sheet transported toward the abutting alignment position by the rotary paddle at least rides on adhesive area applied onto a sheet stacked on the processing tray immediately before the sheet.

(2) In the sheet binding device according to (1), the abutting auxiliary member is a film whose capability of releasing from the adhesive is superior to that of the sheet.

(3) In the sheet binding device according to (1) or (2), the abutting auxiliary member is disposed in a rotary shaft so as to be bent toward an upstream side in the rotation direction of the rotary paddle as compared to a radial direction of the rotary shaft.

(4) In the sheet binding device according to (1) or (2), the abutting auxiliary member is disposed in a rotary shaft so as to tilt toward an upstream side in the rotation direction of the rotary paddle as compared to a radial direction of the rotary shaft.

(5) In the sheet binding device according to any one of (1) to (4), the abutting auxiliary member is disposed at a position corresponding to an adhesive application area of the adhesive application unit in a direction of the rotary shaft.

(6) The sheet binding device according to any one of (1) to (5) further includes a support member that is disposed in the rotary shaft, and that supports the tip end of the sheet temporarily stacked on the temporary tray. The abutting auxiliary member is disposed on a side surface on an upstream side of the support member in the rotation direction of the rotary paddle.

(7) In the sheet binding device according to any one of (1) to (6), the abutting auxiliary member is a polyester film.

Third Embodiment

A third embodiment will be described hereinafter.

The third embodiment is a modification example of the first and second embodiments. The post-processing apparatus according to the third embodiment has a configuration to move the shutter member between the "second retreat position" and the "shielding position," which is different from those of the first and second embodiments. Hereinafter, in the embodiment, the same reference numerals are used for elements having the same functions as those in the above-described respective embodiments, and description thereof will be omitted.

Figure 40:
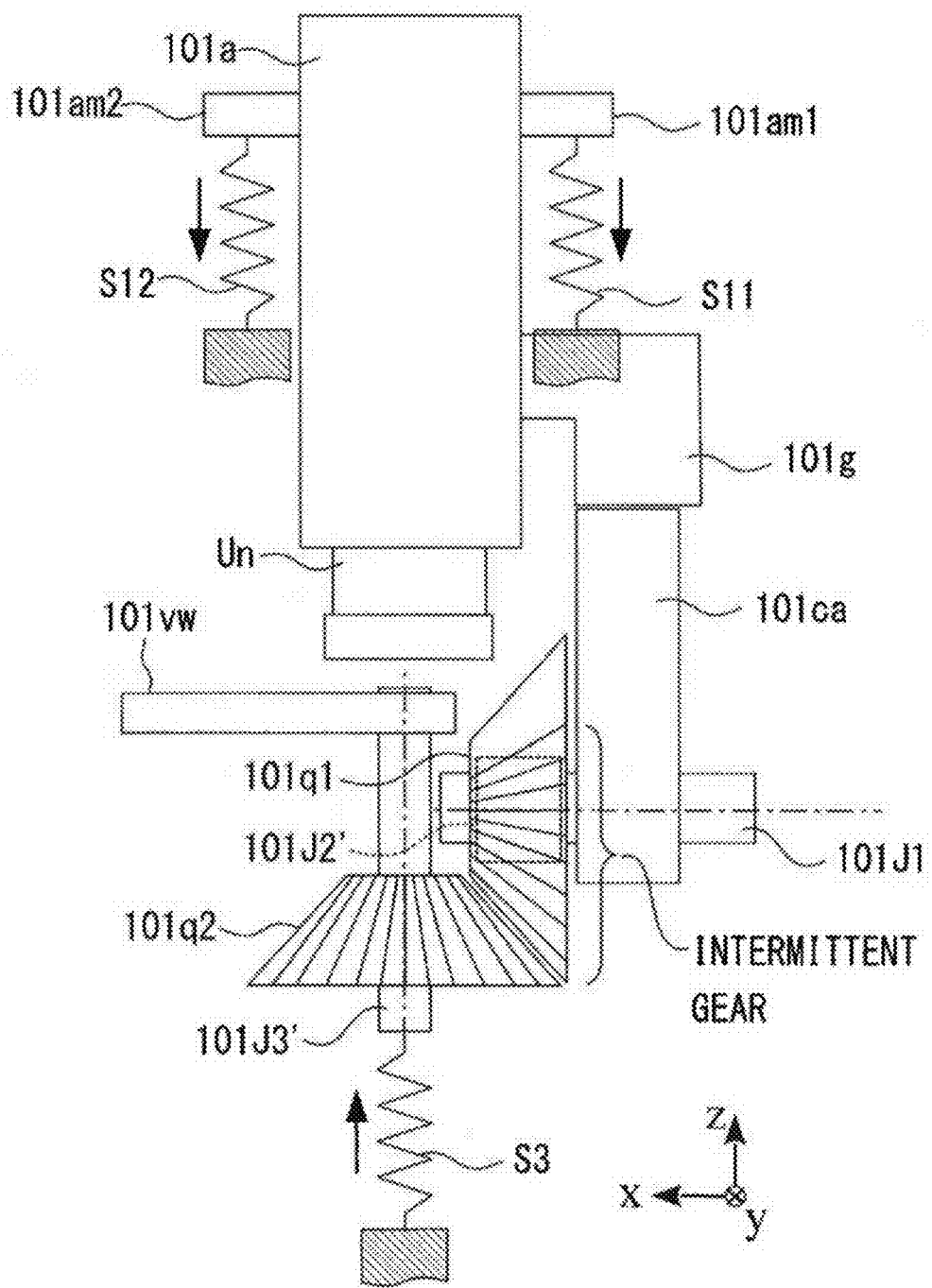
FIG. 40 illustrates a moving mechanism of an adhesive application unit and a shutter member in a sheet binding device according to a third embodiment.
Figure 41:
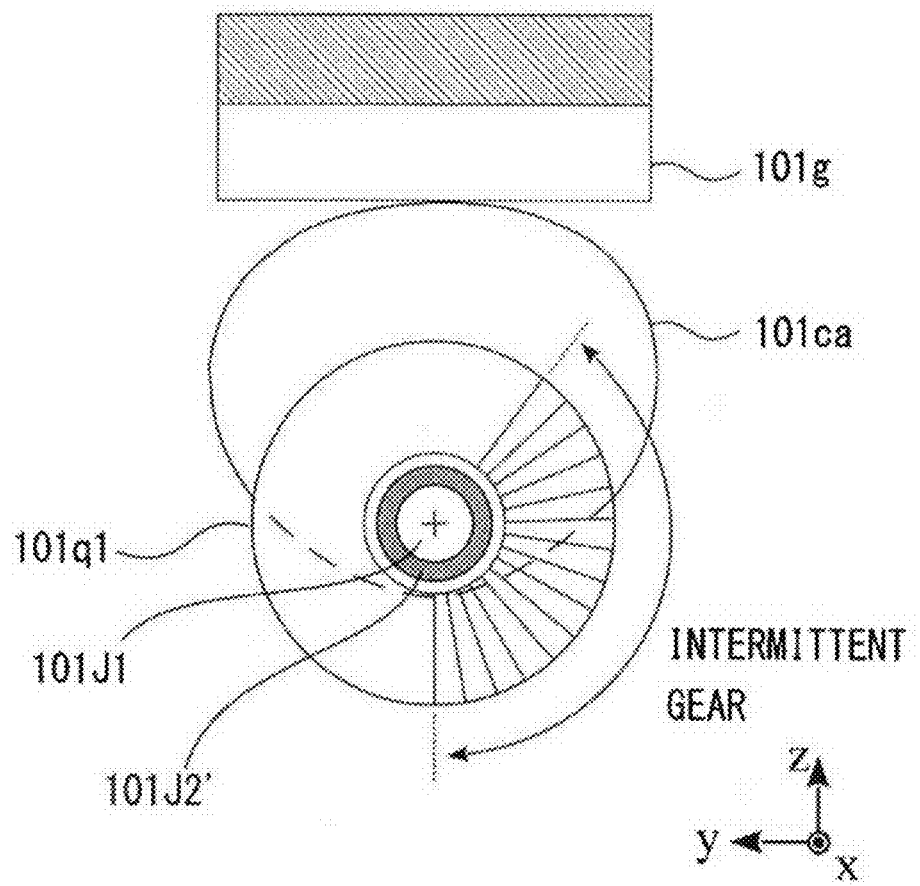
FIG. 41 is a side view of an intermittent bevel gear in the binding unit in an x-axis direction in FIG. 40.

FIG. 40 illustrates a moving mechanism of the adhesive application unit U and the shutter member in the sheet binding device according to the third embodiment. FIG. 41 is a side view of the moving mechanism around an intermittent bevel gear illustrated in FIG. 40 in an x-axis direction.

The sheet binding device according to the third embodiment employs a cam mechanism to move the adhesive application unit U between the "first retreat position" and the "adhesive application position," and employs an intermittent bevel gear to move the shutter member between the "second retreat position" and the "shielding position."

In order to move the shutter member 101vw between the "second retreat position" and the "shielding position," the sheet binding device according to the third embodiment includes a one-way clutch 101J2', an intermittent bevel gear 101q1, a whole circumference bevel gear 101q2, a slide shaft 101J3', and a compression spring S3. Here, the intermittent bevel gear 10181 and the whole circumference bevel gear 101q2 correspond to the gear train.

The one-way clutch 101J2' (corresponding to the second rotary shaft) has a cylindrical shape with a hole, into which the first rotary shaft 101J1 is inserted, and transmits only the rotational drive force to the intermittent bevel gear 101q1 in a predetermined rotational direction of the first rotary shaft 101J1.

The whole circumference bevel gear 101q2 rotates about the slide shaft 101J3' by the rotational drive force being transmitted thereto from the intermittent bevel gear 101q1, when meshing with teeth formed in a predetermined angle range of the intermittent bevel gear 101q1.

The slide shaft 101J3' serves as a slide shaft which allows relative movement in the rotational axis direction and prohibits relative rotation in the rotational direction with respect to the whole circumference bevel gear 101q2. The slide shaft 101J3' is urged toward the intermittent bevel gear 101q1 by the compression spring S3. In addition, a holding arm 101v is fixed to the upper portion of the slide shaft 101J3', and the holding arm 101v is urged by a tensile spring in a direction from the "shielding position" toward the "second retreat position."

Hereinafter, an operation of the sheet binding device according to the third embodiment will be described.

First, description will be made with regard to a pasting operation for the first to the $(n-1)^{th}$ sheets when a sheet bundle to be bound has n sheets in total.

Figure 42:
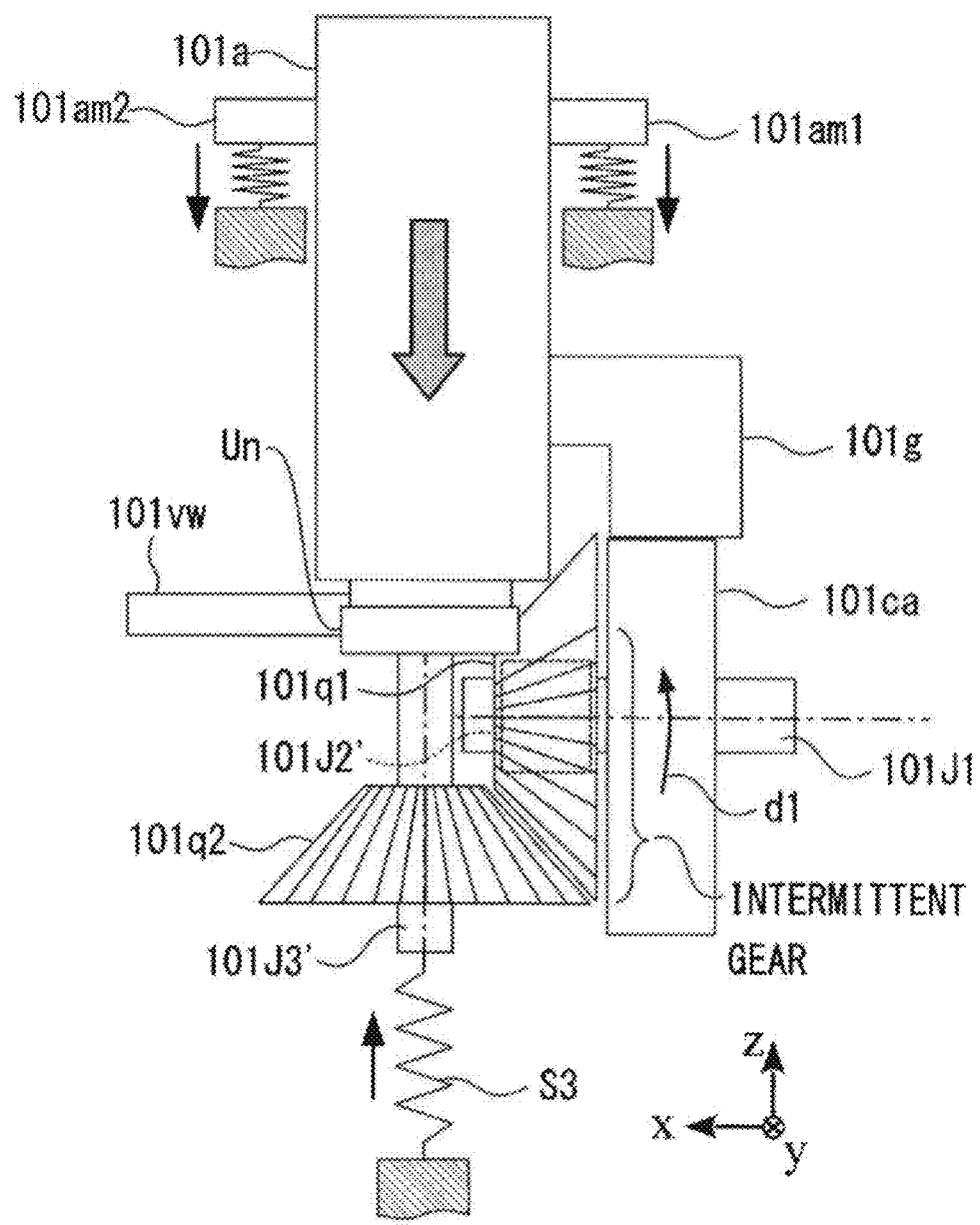
FIGS. 42 and 43 illustrate a sheet binding operation according to the third embodiment.
Figure 43:
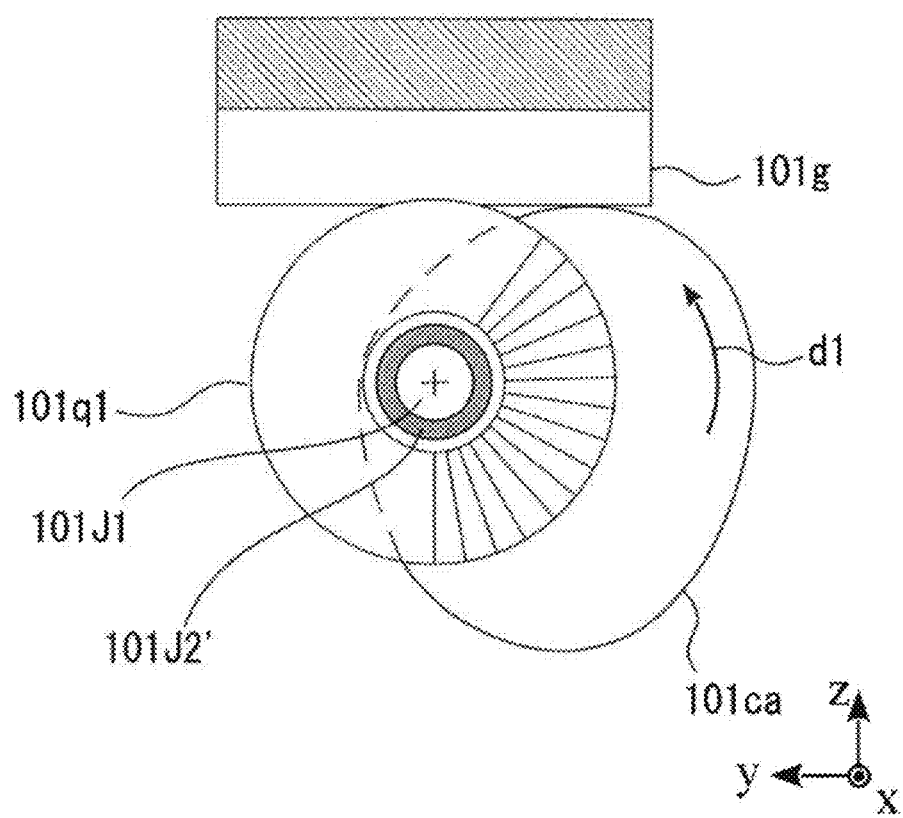

The CPU 701 causes the motor M to rotate the first rotary shaft 101J1 in a rotational direction d1 illustrated in FIGS. 42 and 43, thereby rotating the first cam 101ca in the rotational direction d1. The holding unit 101a is moved from a state of being held at the maximum height ("first retreat position") to the "adhesive application position" by the operation of the first cam surface 101caf of the first cam 101ca rotating in the rotational direction d1.

Next, description will be made with regard to a pasting operation (during pressing) for the $n^{th}$ sheet (last sheet) when the sheet bundle to be bound has n sheets in total.

Figure 44:
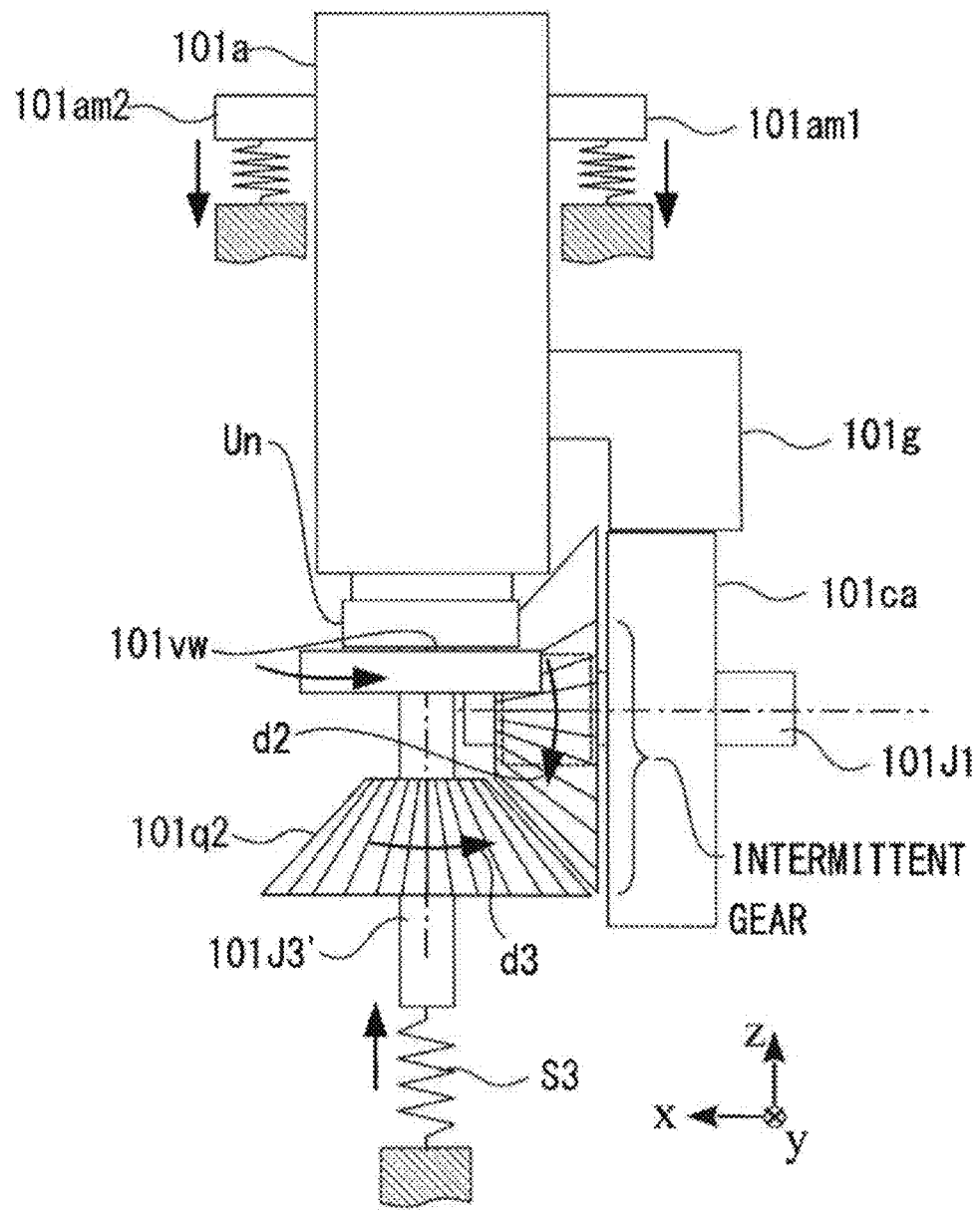
FIGS. 44-47 illustrate a pressing operation according to the third embodiment.
Figure 45:
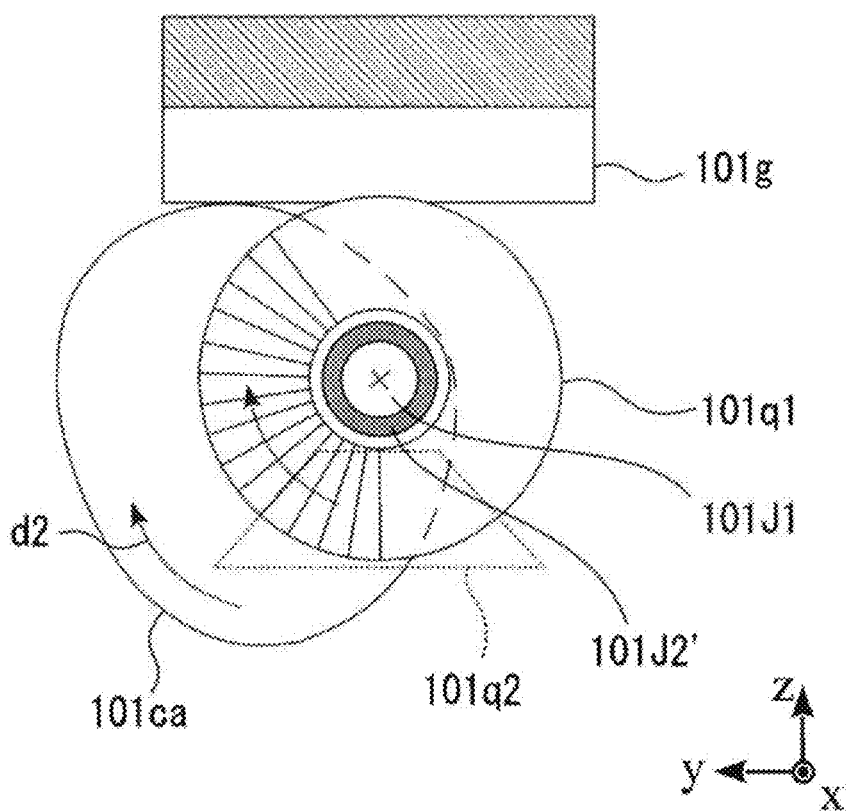

As illustrated in FIGS. 44 and 45, the CPU 701 causes the motor M to rotate the first rotary shaft 101J1 in a rotational direction d2 illustrated in FIGS. 44 and 45, thereby transmitting the rotational drive force from the first rotary shaft 101J1 via the one-way clutch 101J2' to the intermittent bevel gear 10181. When the first cam 101ca is located at an angle at which the holding unit 101a is located at the "first retreat position," teeth partially formed in the intermittent bevel gear 10181 are in a state of meshing with the whole circumference bevel gear 101q2.

The rotational drive force transmitted to the intermittent bevel gear 10181 is transmitted to the whole circumference bevel gear 101q2, and the whole circumference bevel gear 101q2 rotates about the slide shaft 101J3', which is the rotation center in a rotating direction d3 illustrated in FIG. 44. The holding arm 101v is fixed to the slide shaft 101J3', and the holding arm 101v rotates integrally with the whole circumference bevel gear 101q2. This series of operations causes the shutter member 101vw supported by the holding arm 101v to move against the tensile force of the tensile spring from the "second retreat position" to the "shielding position."

The adhesive application unit U of the holding unit 101a lowered toward the "adhesive application position" by the first cam 101ca contacts the shutter member 101vw located at the "shielding position." Thereafter, the adhesive application unit U is lowered toward the "adhesive application position" together with the shutter member 101vw, and presses down the upper surface of the uppermost sheet in the sheet bundle stacked on the processing tray 102.

Figure 46:
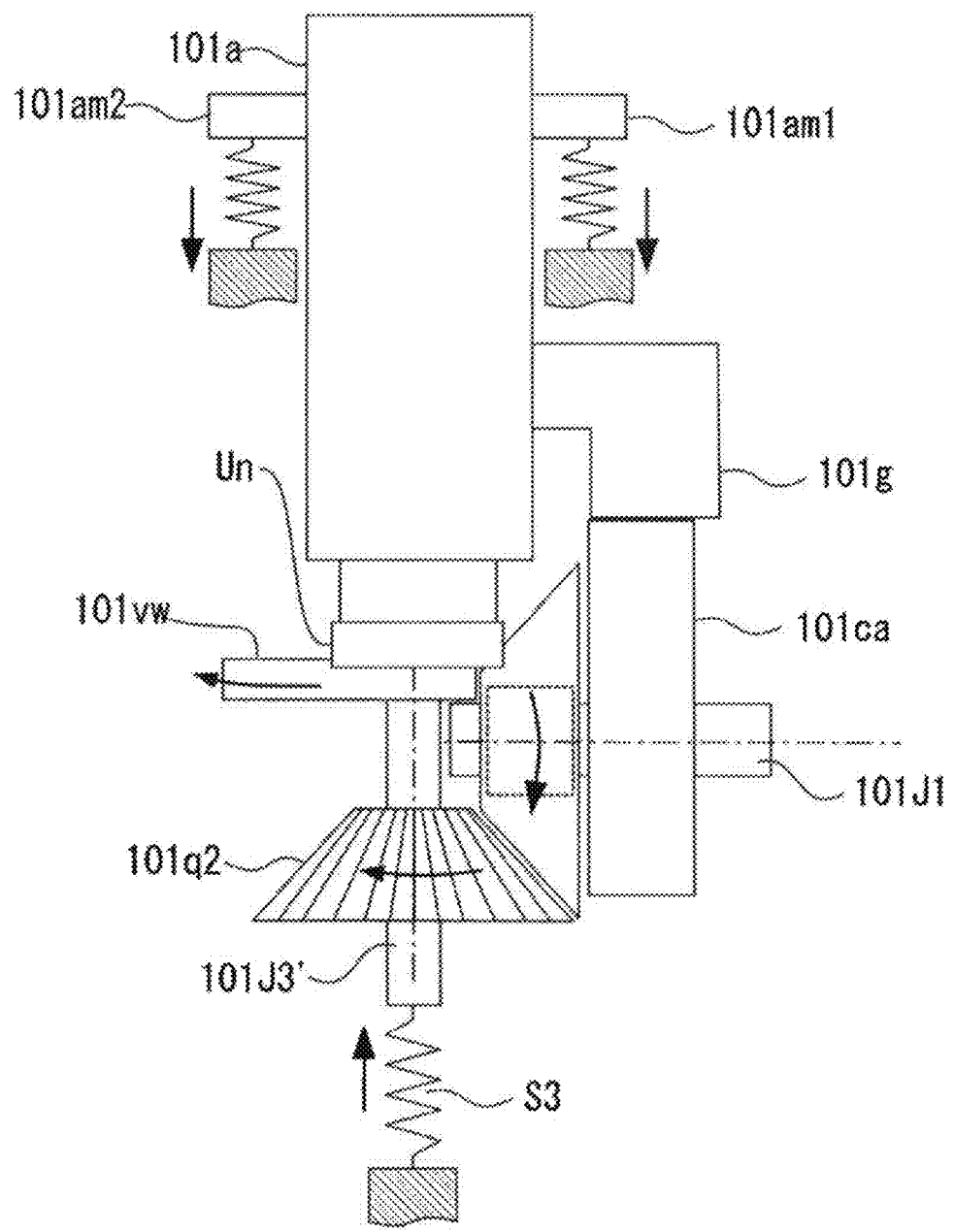
Figure 47:
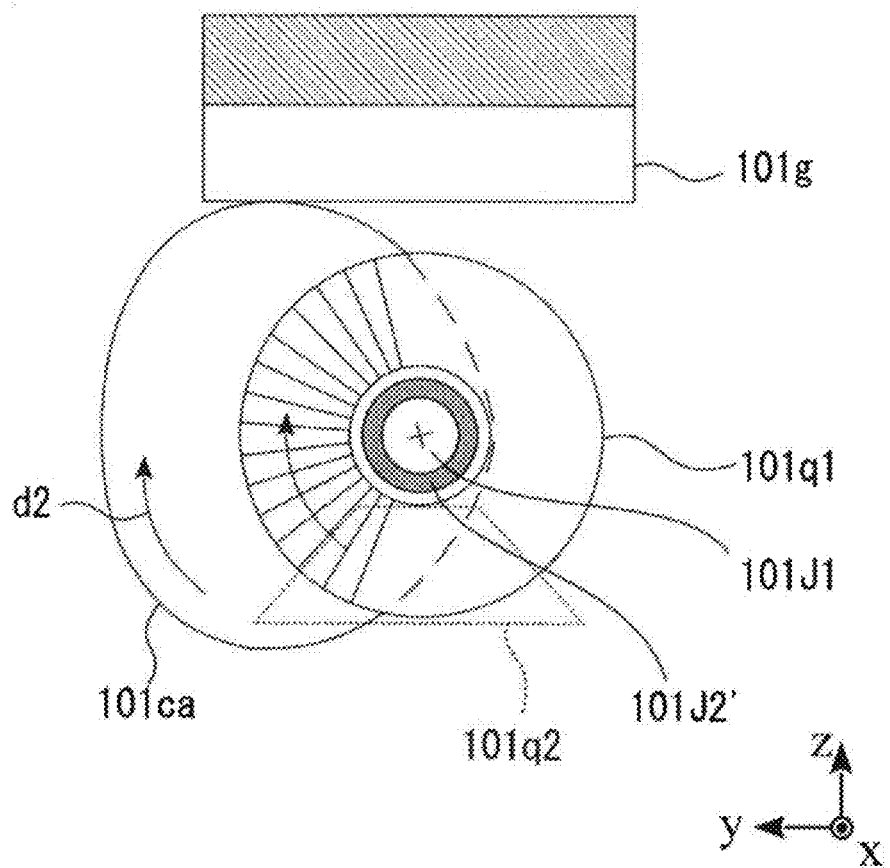

If the upper surface of the uppermost sheet is completely pressed down and the intermittent bevel gear 101q1 is further rotated together with the first cam 101ca, a meshing position between the intermittent bevel gear 10181 and the whole circumference bevel gear 101q2 reaches an angle range having no teeth (refer to FIG. 45), thereby causing the intermittent bevel gear 10181 and the whole circumference bevel gear 101q2 to be in a disengaged state from each other. The shutter member 101vw moved to the "shielding position" against the tensile force of the tensile spring by the intermittent bevel gear 10181 is disengaged from the intermittent bevel gear 10181. In this manner, the shutter member 101*vw* is returned to the "second retreat position" by the tensile force of the tensile spring (refer to FIGS. 46 and 47).

In the above-described embodiments, instead of applying liquefied paste, the adhesive application unit U may perform one of the following operations to put an adhesive.

(1) Pasting by using a double-sided tape having paste on both surfaces (2) Application of paste-like glue (3) Ejection of liquefied paste (4) Application of stick-shaped paste When the adhesive application unit ejects the liquefied paste, as an application unit, it is possible to use an ink jet-type printer head which discharges a pressure sensitive adhesive by driving a piezoelectric element or a thermal element.

In the above-described embodiments, the adhesive application unit applies a pressure sensitive-type adhesive onto the sheet. However, the embodiments are not limited thereto. For example, the adhesive used by the embodiment may have a feature that an adhesive force decreases or substantially dissipates by heat, and therefore be suitable for reuse. In addition, the adhesive used by the adhesive unit may be configured so that the adhesive force decreases or substantially dissipates by light.

In the above-described first and second embodiments, the guided shaft X2 integrally included in the holding arm 101*v* is moved by the second cam surface 101*cbf*. However, the embodiments are not limited thereto. For example, a projection portion formed of a resin projecting from the holding arm 101*v* itself may be moved by the second cam surface 101*cbf*.

In the above-described respective embodiments, when it is described that an adhesive is "applied," the "apply" includes not only coating the adhesive, but also spraying the adhesive. Further, the "apply" includes attaching a tape-type adhesive and putting a stamp-type adhesive. That is, as long as an adhesive adheres to a surface of a sheet, any method may be employed.

Instead of paper, the "sheet" in the above-described respective embodiments may be an OHP film sheet, for example. As long as a sheet-like medium may be bound by the paste, any medium may be used.

In the above-described embodiments, the binding unit T is disposed at the position illustrated in FIG. 1 inside the post-processing apparatus 1. However, the embodiments are not necessarily limited thereto. For example, the binding unit T may be disposed elsewhere inside the devices such as the punching unit 109 or the folding unit B.

Furthermore, a computer configuring the sheet binding device and the post-processing apparatus including the device may include a program for performing the above-described operations as a sheet binding program. In the embodiments, the program for performing functions of embodying the disclosure is previously recorded in a storage area disposed inside the device. Instead, the same program may be downloaded to the device from the network, or the same program stored in a computer-readable recording medium may be installed in the device. As the recording medium, any form may be employed as long as the recording medium may store the program and may be read by the computer. Specifically, the recording medium may include an internal storage device incorporated in the computer such as a ROM and a RAM, a portable storage medium such as a CD-ROM, a flexible disk, a DVD disk, a magneto-optical disk, and an IC card, database for holding computer programs, or other computers and database thereof, and a network transmission medium. The function which may be obtained by installing or downloading the program in advance may be achieved in cooperation with an operating system (OS) installed in the device.

The program may be partially or entirely an execution module which is dynamically generated.

Of various processes performed by causing the CPU or the MPU to execute the program in the above-described respective embodiments, at least some processes may also be performed by ASIC701 in a circuit manner.

According to the above-described embodiments, any desired embodiments may be freely combined with each other as long as technical contradiction does not occur.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet processing apparatus comprising:
a sheet tray on which one or more sheets to be processed are placed;
an adhesive applying device having an end portion that faces the sheet tray and holds an adhesive material, the adhesive applying device being controlled to move towards the sheet tray up to a position at which the end portion is in contact with or proximate to a sheet on the sheet tray and apart from the sheet tray;
a pressing mechanism controlled to move into and out of a moving path of the adhesive applying device; and
a control unit configured to cause the pressing mechanism to be in the moving path of the adhesive applying device when the pressing mechanism is moved towards the sheet tray, such that the pressing mechanism is pressed against a sheet on the sheet tray by the adhesive applying device, wherein:
when the pressing member is pressed by the adhesive applying device, the adhesive material on the end portion does not contact the pressing mechanism,
the end portion has a first region that holds the adhesive material and a second region that does not hold the adhesive material, and
the pressing member contacts the second region of the end portion, when the pressing mechanism is pressed by the adhesive applying device.

2. The sheet processing apparatus according to claim 1, wherein
the pressing mechanism covers the first region of the end portion when the pressing mechanism contacts the second region of the end portion.

3. The sheet processing apparatus according to claim 1, wherein
the adhesive applying device includes a first cam follower engaged with a first cam that is mechanically connected to a first shaft, and the adhesive applying device being moved towards and away from the sheet tray as the first shaft rotates.

4. The sheet processing apparatus according to claim 3, wherein
the pressing mechanism includes a second cam follower engaged with a second cam that is mechanically connected to a second shaft, and the pressing mechanism being moved into and out of the moving path of the adhesive applying device as the second shaft rotates.

5. The sheet processing apparatus according to claim 4, wherein
the first shaft and the second shaft are mechanically connected,
when the first shaft rotates in a first direction, the second shaft does not rotate, and
when the first shaft rotates in a second direction opposite to the first direction, the second shaft rotates in the second direction.

6. The sheet processing apparatus according to claim 5, wherein
when the first shaft rotates in the first direction, the adhesive applying device moves and the pressing mechanism does not move, and
when the first shaft rotates in the second direction, both the adhesive applying device and the pressing mechanism move.

7. The sheet processing apparatus according to claim 5, further comprising:
a first detection unit configured to detect a rotational position of the first shaft; and
a second detection unit configured to detect a rotational position of the second shaft, wherein
the control unit is further configured to adjust a positional relationship between the first shaft and second shaft by rotating the first and second shafts in the first and second direction alternately, based on the detected rotational positions of the first and second shafts.

8. The sheet processing apparatus according to claim 3, wherein
the pressing mechanism includes a gear engaged with a gear mechanically connected to the first shaft, and the pressing mechanism is moved into and out of the moving path of the adhesive applying device as the first shaft rotates.

9. The sheet processing apparatus according to claim 8, wherein
when the first shaft rotates in a first direction, the adhesive applying device moves and the pressing mechanism does not move, and
when the first shaft rotates in a second direction opposite to the first direction, both the adhesive applying device and the pressing mechanism move.

10. The sheet processing apparatus according to claim 1, wherein
the pressing mechanism includes a cam follower engaged with a cam that is connected to a shaft, and the pressing mechanism is moved into and out of the moving path of the adhesive applying device as the shaft rotates.

11. The sheet processing apparatus according to claim 1, wherein
the adhesive applying device is urged towards the sheet tray by a first urging member.

12. The sheet processing apparatus according to claim 11, wherein
the pressing mechanism is urged away from the moving path of the adhesive applying device by a second urging member.

13. The sheet processing apparatus according to claim 1, wherein
the control unit is further configured to determine whether or not a top sheet placed on the sheet tray is a last sheet subject to sheet processing, control the pressing mechanism to be in the moving path of the adhesive applying device when the top sheet is determined to be the last sheet and the adhesive applying device moves towards the sheet tray, and control the pressing mechanism to be out of the moving path of the adhesive applying device when the top sheet is determined to be not the last sheet and the adhesive applying device moves towards the sheet tray.

14. The sheet processing apparatus according to claim 1, wherein
the pressing mechanism covers the first region of the end portion when the pressing mechanism contacts the second region of the end portion.

15. A sheet processing apparatus comprising:
a sheet tray on which one or more sheets to be processed are placed;
an adhesive applying device having an end portion that faces the sheet tray and holds an adhesive material, the adhesive applying device being controlled to move towards the sheet tray up to a position at which the end portion is in contact with or proximate to a sheet on the sheet tray and apart from the sheet tray, the adhesive applying device including a first cam follower engaged with a first cam that is mechanically connected to a first shaft, the adhesive applying device being moved towards and away from the sheet tray as the first shaft rotates;
a pressing mechanism controlled to move into and out of a moving path of the adhesive applying device, the pressing mechanism including a second cam follower engaged with a second cam that is mechanically connected to a second shaft, the pressing mechanism being moved into and out of the moving path of the adhesive applying device as the second shaft rotates; and
a control unit configured to cause the pressing mechanism to be in the moving path of the adhesive applying device when the pressing mechanism is moved towards the sheet tray, such that the pressing mechanism is pressed against a sheet on the sheet tray by the adhesive applying device.

16. The sheet processing apparatus according to claim 15, wherein
the first shaft and the second shaft are mechanically connected,
when the first shaft rotates in a first direction, the second shaft does not rotate, and
when the first shaft rotates in a second direction opposite to the first direction, the second shaft rotates in the second direction.

17. The sheet processing apparatus according to claim 15, wherein
when the first shaft rotates in the first direction, the adhesive applying device moves and the pressing mechanism does not move, and
when the first shaft rotates in the second direction, both the adhesive applying device and the pressing mechanism move.

18. A sheet processing apparatus comprising:
a sheet tray on which one or more sheets to be processed are placed;
an adhesive applying device having an end portion that faces the sheet tray and holds an adhesive material, the adhesive applying device being controlled to move towards the sheet tray up to a position at which the end portion is in contact with or proximate to a sheet on the sheet tray and apart from the sheet tray;

a pressing mechanism controlled to move into and out of a moving path of the adhesive applying device, the pressing mechanism including a cam follower engaged with a cam that is connected to a shaft, the pressing mechanism being moved into and out of the moving path of the adhesive applying device as the shaft rotates; and a control unit configured to cause the pressing mechanism to be in the moving path of the adhesive applying device when the pressing mechanism is moved towards the sheet tray, such that the pressing mechanism is pressed against a sheet on the sheet tray by the adhesive applying device.

19. The sheet processing apparatus according to claim 18, wherein when the pressing member is pressed by the adhesive applying unit, the adhesive material on the end portion does not contact the pressing member.

20. The sheet processing apparatus according to claim 19, wherein the end portion has a first region that holds the adhesive material and a second region that does not hold the adhesive material, and the pressing member contacts the second region of the end portion, when the pressing member is pressed by the adhesive applying unit.

\* \* \* \* \*